(12) United States Patent
Kuo

(10) Patent No.: US 11,564,208 B1
(45) Date of Patent: Jan. 24, 2023

(54) METHOD AND APPARATUS FOR RADIO RESOURCE ALLOCATION TO SUPPORT UE-TO-NETWORK RELAYING IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/839,898

(22) Filed: Jun. 14, 2022

Related U.S. Application Data

(60) Provisional application No. 63/227,919, filed on Jul. 30, 2021.

(51) Int. Cl.
*H04W 72/04* (2009.01)
*H04W 40/22* (2009.01)
*H04W 76/27* (2018.01)

(52) U.S. Cl.
CPC ........... *H04W 72/04* (2013.01); *H04W 40/22* (2013.01); *H04W 76/27* (2018.02)

(58) Field of Classification Search
CPC ...... H04W 72/04; H04W 40/22; H04W 76/27
See application file for complete search history.

(56) References Cited

U.S. PATENT DOCUMENTS

| | | | |
|---|---|---|---|
| 11,229,073 B2* | 1/2022 | Yang | H04W 76/25 |
| 2018/0049256 A1* | 2/2018 | Sang | H04W 48/18 |
| 2019/0174530 A1* | 6/2019 | Kim | H04W 72/12 |
| 2021/0212151 A1* | 7/2021 | Paladugu | H04W 76/28 |

FOREIGN PATENT DOCUMENTS

WO 2021207464 10/2021

* cited by examiner

*Primary Examiner* — Raj Jain
(74) *Attorney, Agent, or Firm* — Blue Capital Law Firm, P.C.

(57) ABSTRACT

A method and device are disclosed for radio resource allocation to support User Equipment-to-Network (UE-to-Network) relaying. The network node establishes a Radio Resource Control (RRC) connection with a remote UE via a relay UE. The network node transmits a first RRC message to the remote UE via the relay UE, wherein the first RRC message includes a Uu radio bearer configuration and a Sidelink (SL) Radio Link Control (RLC) bearer configuration associated with a data radio bearer (DRB) or a signalling radio bearer (SRB) and wherein the network node is allowed to include a first field used to indicate a configuration for UE autonomous resource selection for sidelink communication transmission in the first RRC message and the network node is not allowed to include a second field used to indicate a configuration for UE to transmit sidelink communication based on network scheduling in the first RRC message.

12 Claims, 16 Drawing Sheets ained within the first RRC message. Instead, the SL RLC bearer configuration is provided.

METHOD AND APPARATUS FOR RADIO RESOURCE ALLOCATION TO SUPPORT UE-TO-NETWORK RELAYING IN A WIRELESS COMMUNICATION SYSTEM

CROSS-REFERENCE TO RELATED APPLICATIONS

The present Application claims the benefit of U.S. Provisional Patent Application Ser. No. 63/227,919 filed on Jul. 30, 2021, the entire disclosure of which is incorporated herein in its entirety by reference.

FIELD

This disclosure generally relates to wireless communication networks, and more particularly, to a method and apparatus for radio resource allocation to support UE-to-Network relaying in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for radio resource allocation to support User Equipment-to-Network (UE-to-Network) relaying from the perspective of a network node. In one embodiment, the network node establishes a Radio Resource Control (RRC) connection with a remote UE via a relay UE. The network node also transmits a first RRC message to the remote UE via the relay UE, wherein the first RRC message includes a Uu radio bearer configuration and a Sidelink (SL) Radio Link Control (RLC) bearer configuration associated with a data radio bearer (DRB) or a signalling radio bearer (SRB) and wherein the network node is allowed to include a first field used to indicate a configuration for UE autonomous resource selection for sidelink communication transmission in the first RRC message and the network node is not allowed to include a second field used to indicate a configuration for UE to transmit sidelink communication based on network scheduling in the first RRC message. The network node also receives a RRC complete message from the remote UE via the relay UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V16.3.1, "NR; Radio Resource Control (RRC) protocol specification (Release 16)"; TS 38.300 v16.6.0, "NR; NR and NG-RAN Overall Description; Stage 2 (Release 16)"; TR 23.752 V17.0.0, "Study on system enhancement for Proximity based services (ProSe) in the 5G System (5GS) (Release 17)"; TR 38.836 V17.0.0, "Study on NR sidelink relay (Release 17)"; TS 23.502 V16.5.1, "Procedures for the 5G System (5GS); Stage 2 (Release 16)"; and TS 38.321 V16.1.0, "NR; Medium Access Control (MAC) protocol specification (Release 16)". The standards and documents listed above are hereby expressly incorporated by reference in their entirety.

Figure 1:
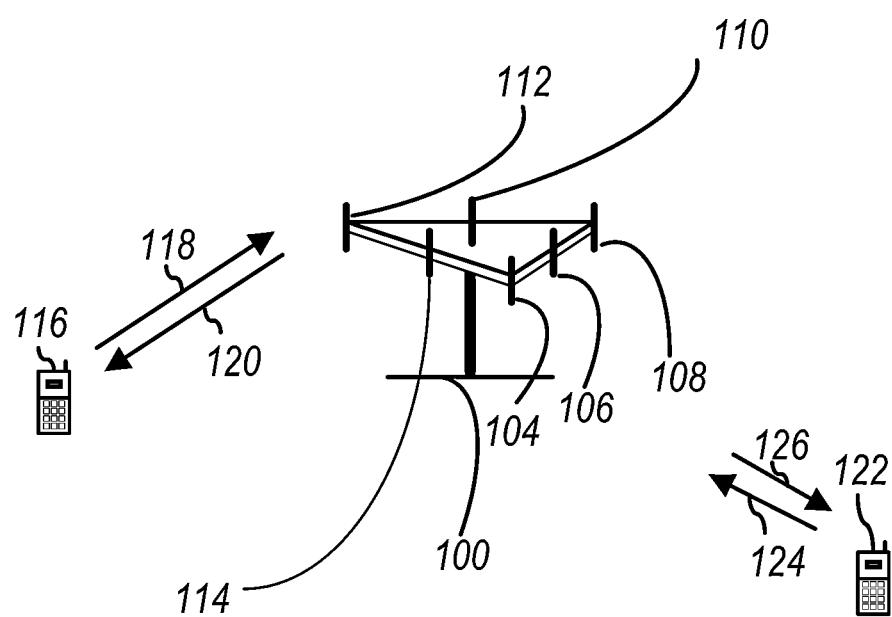
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
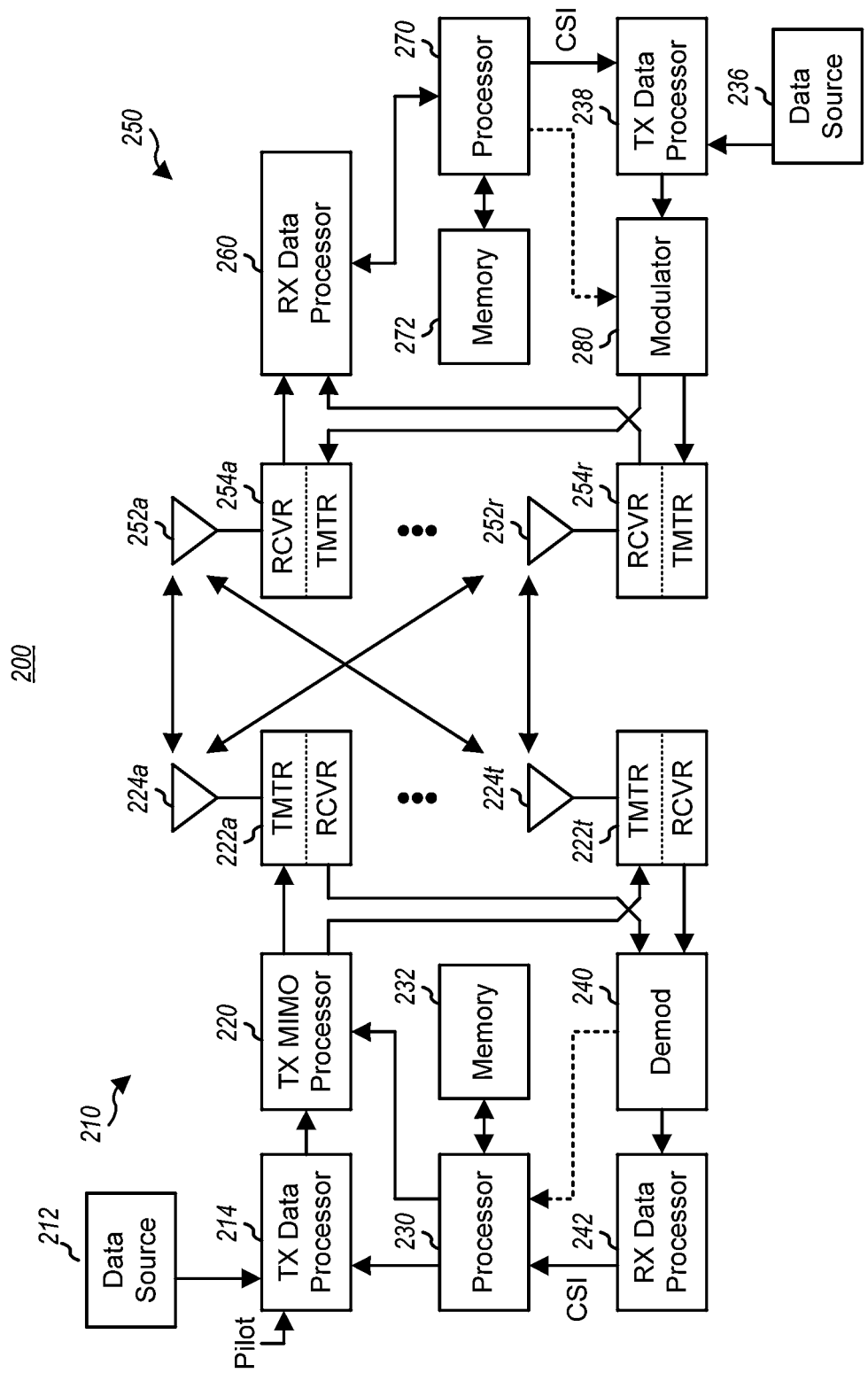
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
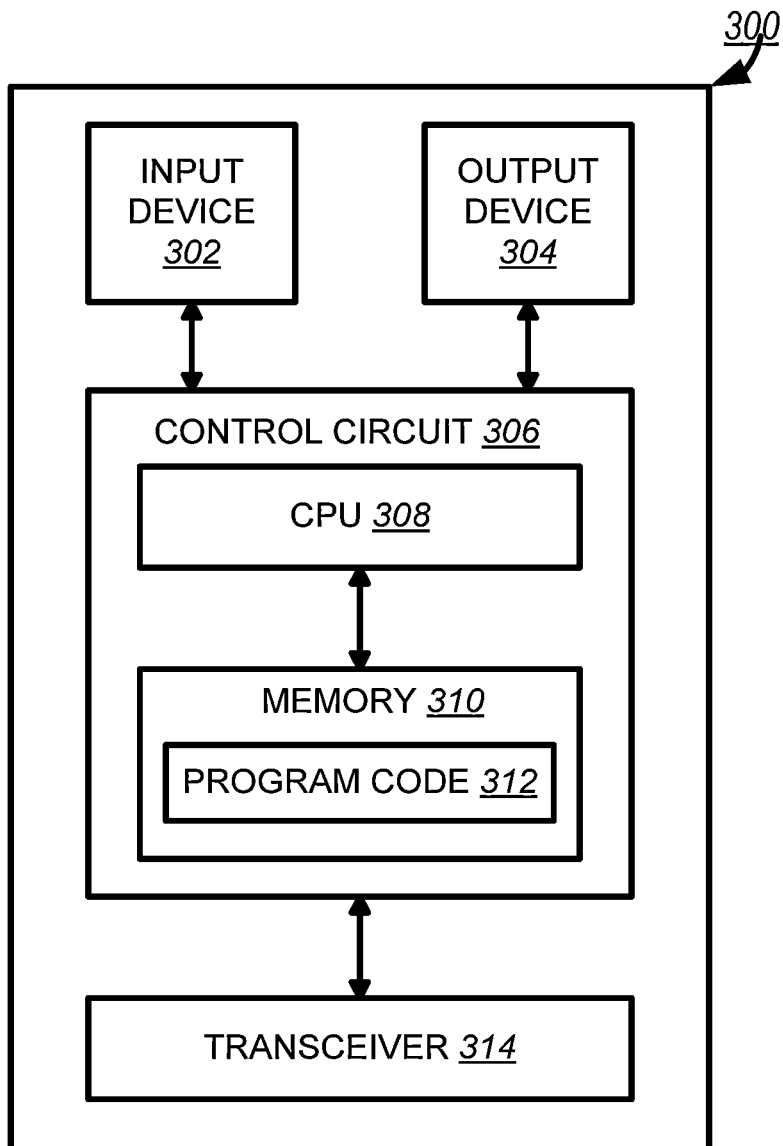
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
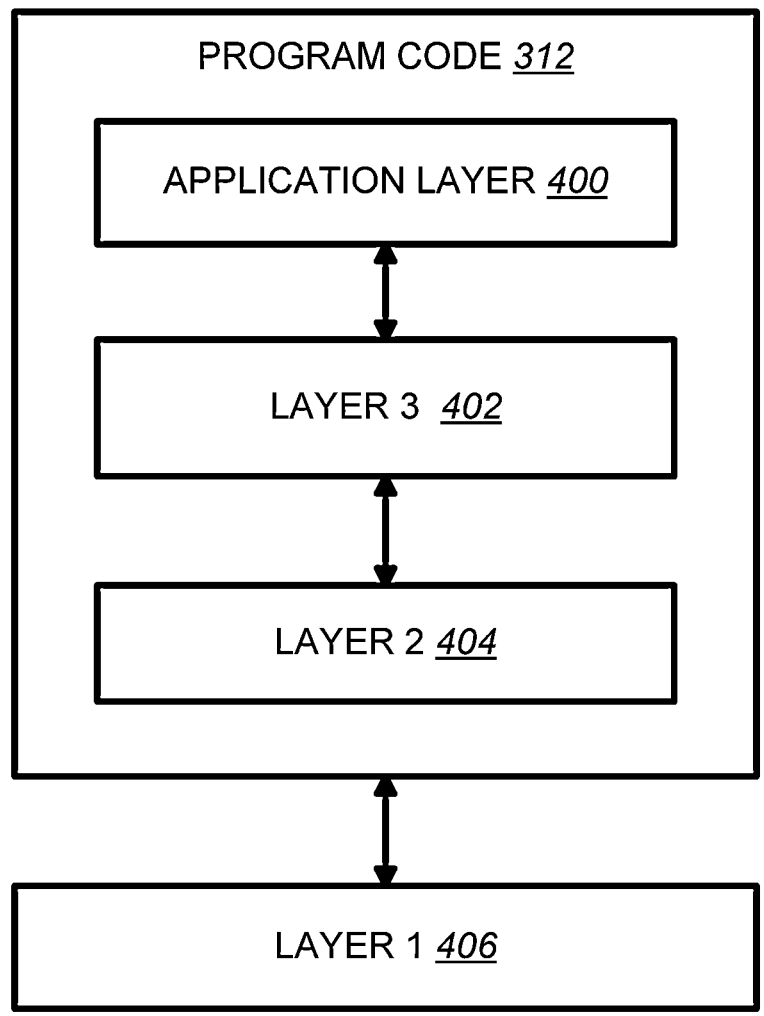
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
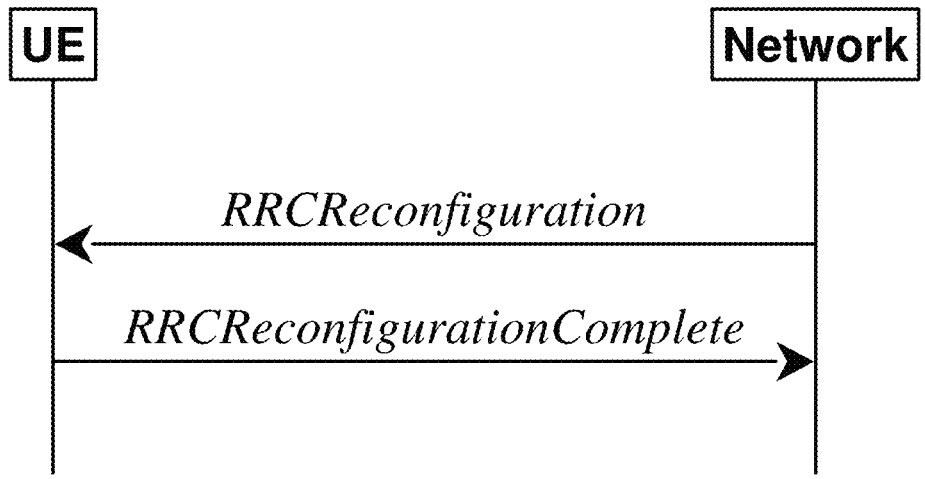
FIG. 5 is a reproduction of FIG. 5.3.5.1-1 of 3GPP TS 38.331 V16.3.1.
Figure 6:
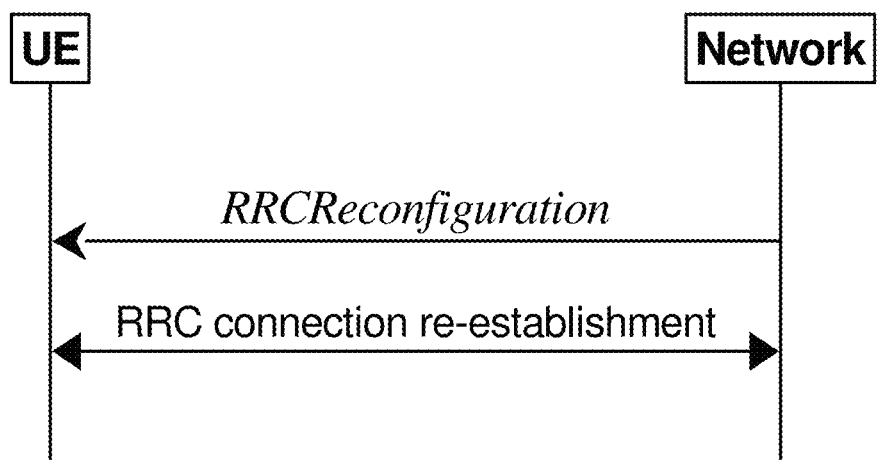
FIG. 6 is a reproduction of FIG. 5.3.5.1-2 of 3GPP TS 38.331 V16.3.1.
Figure 7:
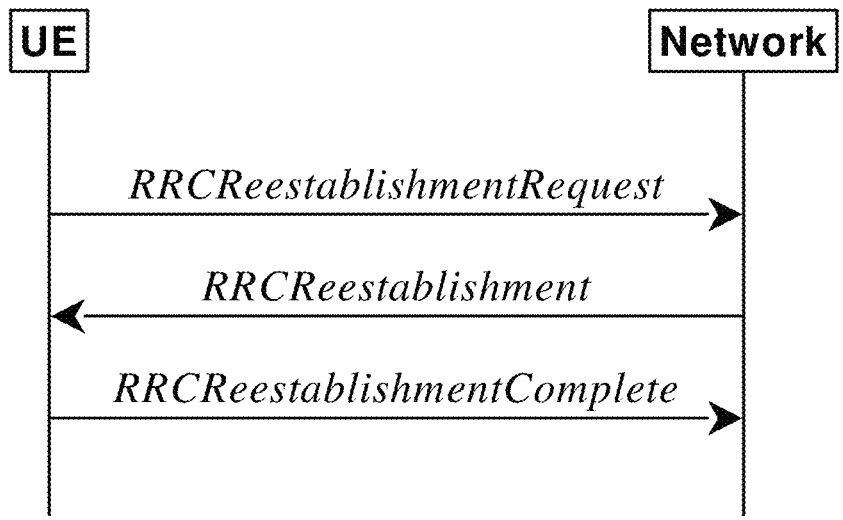
FIG. 7 is a reproduction of FIG. 5.3.7.1-1 of 3GPP TS 38.331 V16.3.1.
Figure 8:
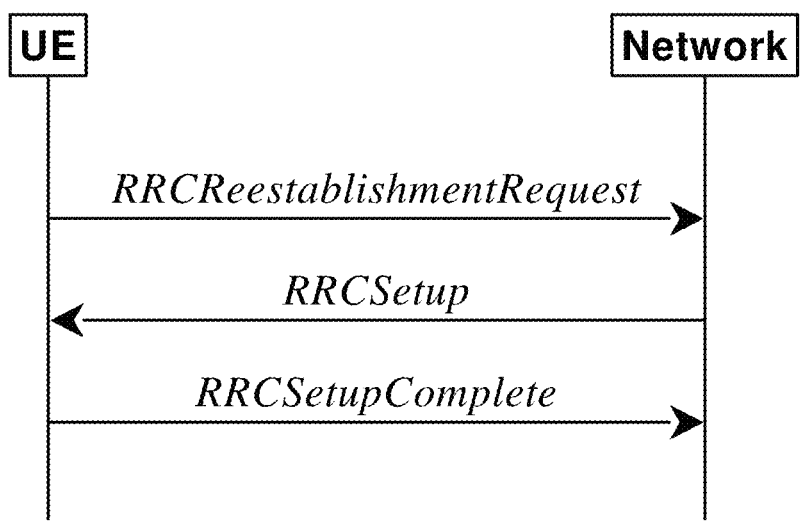
FIG. 8 is a reproduction of FIG. 5.3.7.1-2 of 3GPP TS 38.331 V16.3.1.

3GPP TS 38.331 specifies Radio Resource Control (RRC) reconfiguration, RRC connection re-establishment, sidelink procedures, and sidelink information elements as quoted below:

5.3.5 RRC reconfiguration
5.3.5.1 General
  [FIG. 5.3.5.1-1 of 3GPP TS 38.331 V16.3.1, entitled "RRC reconfiguration, successful", is reproduced as FIG. 5]
  [FIG. 5.3.5.1-2 of 3GPP TS 38.331 V16.3.1, entitled "RRC reconfiguration, failure", is reproduced as FIG. 6]
The purpose of this procedure is to modify an RRC connection, e.g. to establish/modify/release RBs, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE. [ . . . ]
5.3.7 RRC Connection Re-Establishment
5.3.7.1 General
  [FIG. 5.3.7.1-1 of 3GPP TS 38.331 V16.3.1, entitled "RRC connection re-establishment, successful", is reproduced as FIG. 7]
  [FIG. 5.3.7.1-2 of 3GPP TS 38.331 V16.3.1, entitled "RRC re-establishment, fallback to RRC establishment, successful", is reproduced as FIG. 8]
The purpose of this procedure is to re-establish the RRC connection. A UE in RRC_CONNECTED, for which AS security has been activated with SRB2 and at least one DRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.
The network applies the procedure e.g as follows:
  When AS security has been activated and the network retrieves or verifies the UE context:
    to re-activate AS security without changing algorithms;
    to re-establish and resume the SRB1;
  When UE is re-establishing an RRC connection, and the network is not able to retrieve or verify the UE context:
    to discard the stored AS Context and release all RBs;
    to fallback to establish a new RRC connection.

If AS security has not been activated, the UE shall not initiate the procedure but instead moves to RRC_IDLE directly, with release cause 'other'. If AS security has been activated, but SRB2 and at least one DRB or, for IAB, SRB2, are not setup, the UE does not initiate the procedure but instead moves to RRC_IDLE directly, with release cause 'RRC connection failure'.
5.3.7.2 Initiation
The UE initiates the procedure when one of the following conditions is met:
  1> upon detecting radio link failure of the MCG and t316 is not configured, in accordance with 5.3.10; or
  1> upon detecting radio link failure of the MCG while SCG transmission is suspended, in accordance with 5.3.10; or
  1> upon detecting radio link failure of the MCG while PSCell change is ongoing, in accordance with 5.3.10; or
  1> upon re-configuration with sync failure of the MCG, in accordance with sub-clause 5.3.5.8.3; or
  1> upon mobility from NR failure, in accordance with sub-clause 5.4.3.5; or
  1> upon integrity check failure indication from lower layers concerning SRB1 or SRB2, except if the integrity check failure is detected on the RRCReestablishment message; or
  1> upon an RRC connection reconfiguration failure, in accordance with sub-clause 5.3.5.8.2; or
  1> upon detecting radio link failure for the SCG while MCG transmission is suspended, in accordance with subclause 5.3.10.3 in NR-DC or in accordance with TS 36.331 [10] subclause 5.3.11.3 in NE-DC; or
  1> upon reconfiguration with sync failure of the SCG while MCG transmission is suspended in accordance with subclause 5.3.5.8.3; or
  1> upon SCG change failure while MCG transmission is suspended in accordance with TS 36.331 [10] sub-clause 5.3.5.7a; or
  1> upon SCG configuration failure while MCG transmission is suspended in accordance with subclause 5.3.5.8.2 in NR-DC or in accordance with TS 36.331 [10] subclause 5.3.5.5 in NE-DC; or
  1> upon integrity check failure indication from SCG lower layers concerning SRB3 while MCG is suspended; or
  1> upon T316 expiry, in accordance with sub-clause 5.7.3b.5.
[ . . . ]
5.8 Sidelink
5.8.1 General
NR sidelink communication consists of unicast, groupcast and broadcast. For unicast, the PC5-RRC connection is a logical connection between a pair of a Source Layer-2 ID and a Destination Layer-2 ID in the AS. The PC5-RRC signalling, as specified in sub-clause 5.8.9, can be initiated after its corresponding PC5 unicast link establishment (TS 23.287 [55]). The PC5-RRC connection and the corresponding sidelink SRBs and sidelink DRB(s) are released when the PC5 unicast link is released as indicated by upper layers. For each PC5-RRC connection of unicast, one sidelink SRB (i.e. SL-SRB0) is used to transmit the PC5-S message(s) before the PC5-S security has been established. One sidelink SRB (i.e. SL-SRB1) is used to transmit the PC5-S messages to establish the PC5-S security. One sidelink SRB (i.e. SL-SRB2) is used to transmit the PC5-S messages after the PC5-S security has been established, which is protected. One sidelink SRB (i.e. SL-SRB3) is used to transmit the PC5-RRC signalling, which is protected and only sent after the PC5-S security has been established.

For unicast of NR Sidelink communication, AS security comprises of integrity protection and ciphering of PC5 signaling (SL-SRB2 and SL-SRB3) and user data (SL-DRBs). The ciphering and integrity protection algorithms and parameters for a PC5 unicast link are exchanged by PC5-S messages in the upper layers as specified in TS 33.536 [60], and apply to the corresponding PC5-RRC connection in the AS. Once AS security is activated for a PC5 unicast link in the upper layers as specified in TS 33.536 [60], all messages on SL-SRB2 and SL-SRB3 and/or user data on SL-DRBs of the corresponding PC5-RRC connection are integrity protected and/or ciphered by the PDCP.

For unicast of NR Sidelink communication, if the change of the key is indicated by the upper layers as specified in TS 33.536 [60], UE re-establishes the PDCP entity of the SL-SRB1, SL-SRB2, SL-SRB3 and SL-DRBs on the corresponding PC5-RRC connection.

> NOTE 1: In case the configurations for NR sidelink communication are acquired via the E-UTRA, the configurations for NR sidelink communication in SIB12 and sl-ConfigDedicatedNR within RRCReconfiguration used in subclause 5.8 are provided by the configurations in SystemInformationBlockType28 and sl-ConfigDedicatedNR within RRCConnectionReconfiguration as specified in TS 36.331 [10], respectively.
>
> NOTE 2: In this release, there is one-to-one correspondence between the PC5-RRC connection and the PC5 unicast link as specified in TS 38.300[2].
>
> NOTE3: All SL-DRBs related to the same PC5-RRC connection have the same activation/deactivation setting for ciphering and the same activation/deactivation setting for integrity protection as in TS 33.536 [60].

5.8.2 Conditions for NR Sidelink Communication Operation

The UE shall perform NR sidelink communication operation only if the conditions defined in this clause are met:

> 1> if the UE's serving cell is suitable (RRC_IDLE or RRC_INACTIVE or RRC_CONNECTED); and if either the selected cell on the frequency used for NR sidelink communication operation belongs to the registered or equivalent PLMN as specified in TS 24.587 [57] or the UE is out of coverage on the frequency used for NR sidelink communication operation as defined in TS 38.304 [20] and TS 36.304 [27]; or
>
> 1> if the UE's serving cell (RRC_IDLE or RRC_CONNECTED) fulfils the conditions to support NR sidelink communication in limited service state as specified in TS 23.287 [55]; and if either the serving cell is on the frequency used for NR sidelink communication operation or the UE is out of coverage on the frequency used for NR sidelink communication operation as defined in TS 38.304 [20] and TS 36.304 [27]; or
>
> 1> if the UE has no serving cell (RRC_IDLE);

5.8.3 Sidelink UE Information for NR Sidelink Communication 5.8.3.1 General

Figure 9:
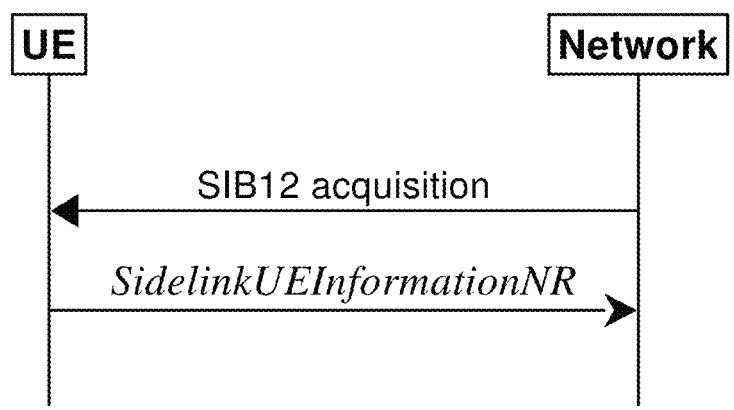
FIG. 9 is a reproduction of FIG. 5.8.3.1-1 of 3GPP TS 38.331 V16.3.1.

> [FIG. 5.8.3.1-1 of 3GPP TS 38.331 V16.3.1, entitled "Sidelink UE information for NR sidelink communication", is reproduced as FIG. 9]

The purpose of this procedure is to inform the network that the UE:

> is interested or no longer interested to receive or transmit NR sidelink communication,
>
> is requesting assignment or release of transmission resource for NR sidelink communication,
>
> is reporting QoS parameters and QoS profile(s) related to NR sidelink communication,
>
> is reporting that a sidelink radio link failure or sidelink RRC reconfiguration failure has been detected,
>
> is reporting the sidelink UE capability information of the associated peer UE for unicast communication,
>
> is reporting the RLC mode information of the sidelink data radio bearer(s) received from the associated peer UE for unicast communication.

5.8.3.2 Initiation

A UE capable of NR sidelink communication that is in RRC_CONNECTED may initiate the procedure to indicate it is (interested in) receiving or transmitting NR sidelink communication in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared.

5.8.7 Sidelink Communication Reception

A UE capable of NR sidelink communication that is configured by upper layers to receive NR sidelink communication shall:

> 1> if the conditions for NR sidelink communication operation as defined in 5.8.2 are met:
>> 2> if the frequency used for NR sidelink communication is included in sl-FreqInfoToAddModList in RRCReconfiguration message or sl-FreqInfoList included in SIB12:
>>> 3> if the UE is configured with sl-RxPool included in RRCReconfiguration message with reconfigwithSync (i.e. handover):
>>>> 4> configure lower layers to monitor sidelink control information and the corresponding data using the pool of resources indicated by sl-RxPool;
>>> 3> else if the cell chosen for NR sidelink communication transmission provides SIB12:
>>>> 4> configure lower layers to monitor sidelink control information and the corresponding data using the pool of resources indicated by sl-RxPool in SIB12;
>> 2> else:
>>> 3> configure lower layers to monitor sidelink control information and the corresponding data using the pool of resources that were preconfigured by sl-RxPool in SL-PreconfigurationNR, as defined in sub-clause 9.3;

5.8.8 Sidelink Communication Transmission

A UE capable of NR sidelink communication that is configured by upper layers to transmit NR sidelink communication and has related data to be transmitted shall:

> 1> if the conditions for NR sidelink communication operation as defined in 5.8.2 are met:
>> 2> if the frequency used for NR sidelink communication is included in sl-FreqInfoToAddModList in sl-ConfigDedicatedNR within RRCReconfiguration message or included in sl-ConfigCommonNR within SIB12:

3> if the UE is in RRC_CONNECTED and uses the frequency included in sl-ConfigDedicatedNR within RRCReconfiguration message:
    4> if the UE is configured with sl-ScheduledConfig:
        5> if T310 for MCG or T311 is running; and if sl-TxPoolExceptional is included in sl-FreqInfoList for the concerned frequency in SIB12 or included in sl-ConfigDedicatedNR in RRCReconfiguration; or
        5> if T316 is running; and if sl-TxPoolExceptional is included in sl-FreqInfoList for the concerned frequency in SIB12 or included in sl-ConfigDedicatedNR in RRCReconfiguration; or
        5> if T301 is running and the cell on which the UE initiated RRC connection re-establishment provides SIB12 including sl-TxPoolExceptional for the concerned frequency; or
        5> if T304 for MCG is running and the UE is configured with sl-TxPoolExceptional included in sl-ConfigDedicatedNR for the concerned frequency in RRCReconfiguration:
            6> configure lower layers to perform the sidelink resource allocation mode 2 based on random selection using the pool of resources indicated by sl-TxPoolExceptional as defined in TS 38.321 [3];
        5> else:
            6> configure lower layers to perform the sidelink resource allocation mode 1 for NR sidelink communication;
        5> if T311 is running, configure the lower layers to release the resources indicated by rrc-ConfiguredSidelinkGrant (if any);
    4> if the UE is configured with sl-UE-SelectedConfig:
        5> if a result of sensing on the resources configured in sl-TxPoolSelectedNormal for the concerned frequency included in sl-ConfigDedicatedNR within RRCReconfiguration is not available in accordance with TS 38.214 [19];
            6> if sl-TxPoolExceptional for the concerned frequency is included in RRCReconfiguration; or
            6> if the PCell provides SIB12 including sl-TxPoolExceptional in sl-FreqInfoList for the concerned frequency:
                7> configure lower layers to perform the sidelink resource allocation mode 2 based on random selection using the pool of resources indicated by sl-TxPoolExceptional as defined in TS 38.321 [3];
        5> else, if the sl-TxPoolSelectedNormal for the concerned frequency is included in the sl-ConfigDedicatedNR within RRCReconfiguration:
            6> configure lower layers to perform the sidelink resource allocation mode 2 based on sensing (as defined in TS 38.321 [3] and TS 38.214 [19]) using the resource pools indicated by sl-TxPoolSelectedNormal for the concerned frequency;
        3> else:
            4> if the cell chosen for NR sidelink communication transmission provides SIB12:
                5> if SIB12 includes sl-TxPoolSelectedNormal for the concerned frequency, and a result of sensing on the resources configured in the sl-TxPoolSelectedNormal is available in accordance with TS 38.214 [19]
                    6> configure lower layers to perform the sidelink resource allocation mode 2 based on sensing using the pool of resources indicated by sl-TxPoolSelectedNormal for the concerned frequency as defined in TS 38.321 [3];
                5> else if SIB12 includes sl-TxPoolExceptional for the concerned frequency:
                    6> from the moment the UE initiates RRC connection establishment or RRC connection resume, until receiving an RRCReconfiguration including sl-ConfigDedicatedNR, or receiving an RRCRelease or an RRCReject; or
                    6> if a result of sensing on the resources configured in sl-TxPoolSelectedNormal for the concerned frequency in SIB12 is not available in accordance with TS 38.214 [19]:
                        7> configure lower layers to perform the sidelink resource allocation mode 2 based on random selection (as defined in TS 38.321 [3] and TS 38.214 [19]) using one of the resource pools indicated by sl-TxPoolExceptional for the concerned frequency;
    2> else:
        3> configure lower layers to perform the sidelink resource allocation mode 2 based on sensing (as defined in TS 38.321 [3] and TS 38.213 [13]) using the resource pool indicated by sl-TxPoolSelectedNormal in SidelinkPreconfigNR for the concerned frequency.

The UE capable of NR sidelink communication that is configured by upper layers to transmit NR sidelink communication shall perform sensing on all pools of resources which may be used for transmission of the sidelink control information and the corresponding data. The pools of resources are indicated by SidelinkPreconfigNR, sl-TxPoolSelectedNormal in sl-ConfigDedicatedNR, or sl-TxPoolSelectedNormal in SIB12 for the concerned frequency, as configured above.

[ . . . ]

5.8.9.1a.2 Sidelink DRB Addition/Modification
5.8.9.1a.2.1 Sidelink DRB Addition/Modification Conditions
For NR sidelink communication, a sidelink DRB addition is initiated only in the following cases:
    1> if any sidelink QoS flow is (re)configured by sl-ConfigDedicatedNR, SIB12, SidelinkPreconfigNR and is to be mapped to one sidelink DRB, which is not established; or
    1> if any sidelink QoS flow is (re)configured by RRCReconfigurationSidelink and is to be mapped to a sidelink DRB, which is not established;
For NR sidelink communication, a sidelink DRB modification is initiated only in the following cases:
    1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in sub-clause 5.8.9.1a.2.1, the UE capable of NR sidelink communication that is configured by upper layers to perform NR sidelink communication shall:
- 1> for groupcast and broadcast; or
- 1> for unicast, if the sidelink DRB addition was triggered due to the reception of the RRCReconfigurationSidelink message; or
- 1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:
  - 2> if an SDAP entity for NR sidelink communication associated with the destination and the cast type of the sidelink DRB does not exist:
    - 3> establish an SDAP entity for NR sidelink communication as specified in TS 37.324 [24] clause 5.1.1;
  - 2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
  - 2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;
  - 2> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;
  - 2> if this procedure was due to the reception of a RRCReconfigurationSidelink message:
    - 3> configure the MAC entity with a logical channel in accordance with the sl-MAC-LogicalChannelConfigPC5 received in the RRCReconfigurationSidelink associated with the sidelink DRB, and perform the sidelink UE information procedure in sub-caluse 5.8.3 for unicast if need;
  - 2> else:
    - 3> configure the MAC entity with a logical channel associated with the sidelink DRB, by assigning a new logical channel identity, in accordance with the sl-MAC-LogicalChannelConfig received in the sl-ConfigDedicatedNR, SIB12, SidelinkPreconfigNR.
  - NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in sub-clause 5.8.9.1a.2.1, the UE capable of NR sidelink communication that is configured by upper layers to perform NR sidelink communication shall:
- 1> for groupcast and broadcast; or
- 1> for unicast, if the sidelink DRB modification was triggered due to the reception of the RRCReconfigurationSidelink message; or
- 1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
  - 2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
  - 2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
  - 2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
  - 2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.

[ . . . ]

6.3.5 Sidelink Information Elements

[ . . . ]

SL-ConfigDedicatedNR

The IE SL-ConfigDedicatedNR specifies the dedicated configuration information for NR sidelink communication.

SL-ConfigDedicatedNR Information Element

```
. . . ASN1START
. . . TAG-SL-CONFIGDEDICATEDNR-START
SL-ConfigDedicatedNR-r16 ::= SEQUENCE {
    sl-PHY-MAC-RLC-Config-r16    SL-PHY-MAC-RLC-Config-r16 OPTIONAL, . . . Need M
    sl-RadioBearerToReleaseList-r16 SEQUENCE (SIZE (1 . . . maxNrofSLRB-r16)) OF SLRB-Uu-ConfigIndex-r16 OPTIONAL, . . . Need N
    sl-RadioBearerToAddModList-r16 SEQUENCE (SIZE (1 . . . maxNrofSLRB–r16)) OF SL-RadioBearerConfig-r16 OPTIONAL, . . . Need N
    sl-MeasConfigInfoToReleaseList-r16 SEQUENCE (SIZE (1 . . . maxNrofSL-Dest-r16)) OF SL-DestinationIndex-r16 OPTIONAL, . . . Need N
    sl-MeasConfigInfoToAddModList-r16    SEQUENCE (SIZE (1 . . . maxNrofSL-Dest-r16)) OF SL-MeasConfigInfo-r16 OPTIONAL, . . . Need M
    t400-r16 ENUMERATED (ms100, ms200, ms300, ms400, ms600, ms1000, ms1500, ms2000) OPTIONAL, . . . Need M
    . . .
}
SL-DestinationIndex-r16 ::= INTEGER (0 . . . maxNrofSL-Dest-1-r16)
SL-PHY-MAC-RLC-Config-r16 ::= SEQUENCE{
    sl-ScheduledConfig-r16    SetupRelease {SL-ScheduledConfig-r16} OPTIONAL, . . . Need M
    sl-UE-SelectedConfig-r16 SetupRelease {SL-UE-SelectedConfig-r16} OPTIONAL, . . . Need M
``` sl-FreqInfoToReleaseList-r16 SEQUENCE (SIZE (1 . . . maxNrofFreqSL-r16)) of SL-Freq-Id-r16 OPTIONAL, . . . Need M
    sl-FreqInfoToAddModList-r16 SEQUENCE (SIZE (1 . . . maxNrofFreqSL-r16)) OF SL-FreqConfig-r16 OPTIONAL, . . . Need N
    sl-RLC-BearerToReleaseList-r16 SEQUENCE (SIZE (1 . . . maxSL-LCID-r16)) OF SL-RLC-BearerConfigIndex-r16 OPTIONAL, . . . Need N
    sl-RLC-BearerToAddModList-r16 SEQUENCE (SIZE (1 . . . maxSL-LCID-r16)) OF SL-RLC-BearerConfig-r16 OPTIONAL, . . . Need N
    sl-MaxNumConsecutiveDTX-r16 ENUMERATED {n1, n2, n3, n4, n6, n8, n16, n32} OPTIONAL, . . . Need M
    sl-CSI-Acquisition-r16 ENUMERATED {enabled} OPTIONAL, . . . Need R
    sl-CSI-SchedulingRequestId-r16 SetupRelease {SchedulingRequestId} OPTIONAL, . . . Need M
    sl-SSB-PriorityNR-r16 INTEGER (1 . . . 8) OPTIONAL, . . . Need R
    networkControlledSyncTx-r16 ENUMERATED {on, off} OPTIONAL, . . . Need M
}
. . . TAG-SL-CONFIGDEDICATEDNR-STOP
. . . ASN1STOP SL-ConfigDedicatedNR field descriptions sl-MeasConfigInfoToAddModList
This field indicates the RSRP measurement configurations for unicast destinations to add and/or modify.
sl-MeasConfigInfoToReleaseList
This field indicates the RSRP measurement configurations for unicast destinations to remove.
sl-PHY-MAC-RLC-Config
This field indicates the lower layer sidelink radio bearer configurations.
sl-RadioBearerToAddModList
This field indicates one or multiple sidelink radio bearer configurations to add and/or modify.
sl-RadioBearerToReleaseList
This field indicates one or multiple sidelink radio bearer configurations to remove.
SL-PHY-MAC-RLC-Config field descriptions networkControlledSyncTx
This field indicates whether the UE shall transmit synchronisation information (i.e. become synchronisation source). Value on indicates the UE to transmit synchronisation information while value off indicates the UE to not transmit such information.
sl-MaxNumConsecutiveDTX
This field indicates the maximum number of consecutive HARQ DTX before triggering sidelink RLF. Value n1 corresponds to 1, value n2 corresponds to 2, and so on.
sl-FreqInfo ToAddModList
This field indicates the NR sidelink communication configuration on some carrier frequency (ies) to add and/or modify. In this release, only one entry can be configured in the list.
sl-FreqInfo ToReleaseList
This field indicates the NR sidelink communication configuration on some carrier frequency (ies) to remove. In this release, only one entry can be configured in the list.
sl-RLC-BearerToAddModList
This field indicates one or multiple sidelink RLC bearer configurations to add and/or modify.
sl-RLC-BearerToReleaseList
This field indicates one or multiple sidelink RLC bearer configurations to remove.
sl-ScheduledConfig
Indicates the configuration for UE to transmit NR sidelink communication based on network scheduling. This field is not configured simultaneously with sl-UE-SelectedConfig.
sl-UE-SelectedConfig
Indicates the configuration used for UE autonomous resource selection. This field is not configured simultaneously with sl-ScheduledConfig.

sl-CSI-Acquisition
Indicates whether CSI reporting is enabled in sidelink unicast. If the field is absent, sidelink CSI reporting is disabled.
sl-CSI-SchedulingRequestId
If present, it indicates the scheduling request configuration applicable for sidelink CSI report MAC CE, as specified in TS 38.321 [3].
sl-SSB-PriorityNR
This field indicates the priority of NR sidelink SSB transmission and reception.

[ . . . ]
SL-ScheduledConfig
The IE SL-ScheduledConfig specifies sidelink communication configurations used for network scheduled NR sidelink communication.

SL-ScheduledConfig Information Element

. . . ASN1START
. . . TAG-SL-SCHEDULEDCONFIG-START
SL-ScheduledConfig-r16 ::= SEQUENCE {
    sl-RNTI-r16 RNTI-Value,
    mac-MainConfigSL-r16    MAC-MainConfigSL-r16 OPTIONAL, . . . Need M
    sl-CS-RNTI-r16 RNTI-Value OPTIONAL, . . . Need M
    sl-PSFCH-ToPUCCH-r16 SEQUENCE (SIZE (1 . . . 8)) OF INTEGER (0 . . . 15) OPTIONAL, . . . Need M
    sl-ConfiguredGrantConfigList-r16 SL-ConfiguredGrantConfigList-r16 OPTIONAL, . . . Need M
    . . . ,
    [[
    sl-DCI-ToSL-Trans-r16 SEQUENCE (SIZE (1 . . . 8)) OF INTEGER (1 . . . 32) OPTIONAL, . . . Need M
    ]]
}
MAC-MainConfigSL-r16 ::= SEQUENCE {
    sl-BSR-Config-r16 BSR-Config OPTIONAL, . . . Need M
    ul-PrioritizationThres-r16 INTEGER (1 . . . 16) OPTIONAL, . . . Need M
    sl-PrioritizationThres-r16 INTEGER (1 . . . 8) OPTIONAL, . . . Need M
    . . .
}
SL-ConfiguredGrantConfigList-r16 ::= SEQUENCE{
    sl-ConfiguredGrantConfigToReleaseList-r16 SEQUENCE (SIZE (1 . . . maxNrofCG-SL-r16)) OF SL-ConfigIndexCG-r16 OPTIONAL, . . . Need N
    sl-ConfiguredGrantConfigToAddModList-r16 SEQUENCE (SIZE (1 . . . maxNrofCG-SL-r16)) OF SL-ConfiguredGrantConfig-r16 OPTIONAL, . . . Need N
}
. . . TAG-SL-SCHEDULEDCONFIG-STOP
. . . ASN1STOP
SL-UE-SelectedConfig
IE SL-UE-SelectedConfig specifies sidelink communication configurations used for UE autonomous resource selection.

SL-UE-SelectedConfig Information Element

. . . ASN1START
. . . TAG-SL-UE-SELECTEDCONFIG-START
SL-UE-SelectedConfig-r16 ::= SEQUENCE {
    sl-PSSCH-TxConfigList-r16 SL-PSSCH-TxConfigList-r16 OPTIONAL, . . . Need R
    sl-ProbResourceKeep-r16 ENUMERATED {v0, v0dot2, v0dot4, v0dot6, v0dot8} OPTIONAL, . . . Need R sl-ReselectAfter-r16 ENUMERATED {n1, n2, n3, n4, n5, n6, n7, n8, n9} OPTIONAL, . . . Need R
sl-CBR-CommonTxConfigList-r16 SL-CBR-CommonTxConfigList-r16 OPTIONAL, . . . Need R
ul-PrioritizationThres-r16 INTEGER (1 . . . 16) OPTIONAL, . . . Need R
sl-PrioritizationThres-r16 INTEGER (1 . . . 8) OPTIONAL, . . . Need R
. . .
}
. . . TAG-SL-UE-SELECTEDCONFIG-STOP
. . . ASN1STOP 9.3 Sidelink Pre-Configured Parameters This ASN.1 segment is the start of the NR definitions of pre-configured sidelink parameters.

NR-Sidelink-Preconf

. . . ASN1START
. . . TAG-NR-SIDELINK-PRECONF-DEFINITIONS-START
NR-Sidelink-Preconf DEFINITIONS AUTOMATIC TAGS ::=
BEGIN
IMPORTS
SL-CBR-CommonTxConfigList-r16,
SL-FreqConfigCommon-r16,
SL-RadioBearerConfig-r16,
SL-RLC-BearerConfig-r16,
SL-EUTRA-AnchorCarrierFreqList-r16,
SL-NR-AnchorCarrierFreqList-r16,
SL-MeasConfigCommon-r16,
SL-UE-SelectedConfig-r16,
TDD-UL-DL-ConfigCommon,
maxNrofFreqSL-r16,
maxNrofSLRB-r16,
maxSL-LCID-r16
FROM NR-RRC-Definitions;
. . . TAG-NR-SIDELINK-PRECONF-DEFINITIONS-STOP
. . . ASN1STOP SL-PreconfigurationNR The IE SL-PreconfigurationNR includes the sidelink pre-configured parameters used for NR sidelink communication. Need codes or conditions specified for subfields in SL-PreconfigurationNR do not apply.

SL-PreconfigurationNR Information Elements

. . . ASN1START
. . . TAG-SL-PRECONFIGURATIONNR-START
SL-PreconfigurationNR-r16 ::= SEQUENCE {
  sidelinkPreconfigNR-r16 SidelinkPreconfigNR-r16,
  . . .
}
SidelinkPreconfigNR-r16 ::= SEQUENCE {
  sl-PreconfigFreqInfoList-r16 SEQUENCE (SIZE (1 . . . maxNrofFreqSL-r16)) OF SL-FreqConfigCommon-r16 OPTIONAL,
  sl-PreconfigNR-AnchorCarrierFreqList-r16 SL-NR-AnchorCarrierFreqList-r16 OPTIONAL,
  sl-PreconfigEUTRA-AnchorCarrierFreqList-r16 SL-EUTRA-AnchorCarrierFreqList-r16 OPTIONAL,
  sl-RadioBearerPreConfigList-r16 SEQUENCE (SIZE (1 . . . maxNrofSLRB-r16)) OF SL-RadioBearerConfig-r16 OPTIONAL,
  sl-RLC-BearerPreConfigList-r16 (SEQUENCE (SIZE (1 . . . maxSL-LCID-r16)) OF SL-RLC-BearerConfig-r16 OPTIONAL,
  sl-MeasPreConfig-r16 SL-MeasConfigCommon-r16 OPTIONAL,
  sl-OffsetDFN-r16 INTEGER (1 . . . 1000) OPTIONAL,
  t400-r16 ENUMERATED{ms100, ms200, ms300, ms400, ms600, ms1000, ms1500, ms2000} OPTIONAL,
  sl-MaxNumConsecutiveDTX-r16 ENUMERATED {n1, n2, n3, n4, n6, n8, n16, n32} OPTIONAL,
  sl-SSB-PriorityNR-r16 INTEGER (1 . . . 8) OPTIONAL,
  sl-PreconfigGeneral-r16 SL-PreconfigGeneral-r16 OPTIONAL,
  sl-UE-SelectedPreConfig-r16 SL-UE-SelectedConfig-r16 OPTIONAL,
  sl-CSI-Acquisition-r16 ENUMERATED {enabled} OPTIONAL,
  sl-RoHC-Profiles-r16 SL-RoHC-Profiles-r16 OPTIONAL,
  sl-MaxCID-r16 INTEGER (1 . . . 16383) DEFAULT 15,
  . . .
}
SL-PreconfigGeneral-r16 ::= SEQUENCE{
  sl-TDD-Configuration-r16 TDD-UL-DL-ConfigCommon OPTIONAL,
  reservedBits-r16 BIT STRING (SIZE (2)) OPTIONAL,
  . . .
}
SL-RoHC-Profiles-r16 ::= SEQUENCE {
  profile0x0001-r16 BOOLEAN,
  profile0x0002-r16 BOOLEAN,
  profile0x0003-r16 BOOLEAN,
  profile0x0004-r16 BOOLEAN,
  profile0x0006-r16 BOOLEAN,
  profile0x0101-r16 BOOLEAN,
  profile0x0102-r16 BOOLEAN,
  profile0x0103-r16 BOOLEAN,
  profile0x0104-r16 BOOLEAN,
}
. . . TAG-SL-PRECONFIGURATIONNR-STOP
. . . ASN1STOP 3GPP TS 38.300 specifies radio resource allocation for sidelink communications as follows:

16.9.3 Radio Resource Allocation 16.9.3.1 General

For NR sidelink communication, the UE can operate in two modes as specified in 5.7.2 for resource allocation in sidelink:

Scheduled resource allocation, characterized by:
  The UE needs to be RRC_CONNECTED in order to transmit data;
  NG-RAN schedules transmission resources.
UE autonomous resource selection, characterized by:
  The UE can transmit data when inside NG-RAN coverage, irrespective of which RRC state the UE is in, and when outside NG-RAN coverage;
  The UE autonomously selects transmission resources from resource pool(s).
  For NR sidelink communication, the UE performs sidelink transmissions only on a single carrier.

16.9.3.2 Scheduled Resource Allocation

NG-RAN can dynamically allocate resources to the UE via the SL-RNTI on PDCCH(s) for NR sidelink communication.

In addition, NG-RAN can allocate sidelink resources to a UE with two types of configured sidelink grants:
  With type 1, RRC directly provides the configured sidelink grant only for NR sidelink communication;
  With type 2, RRC defines the periodicity of the configured sidelink grant while PDCCH can either signal and activate the configured sidelink grant, or deactivate it. The PDCCH is addressed to SL-CS-RNTI for NR sidelink communication.

Besides, NG-RAN can also semi-persistently allocate sidelink resources to the UE via the SL Semi-Persistent Scheduling V-RNTI on PDCCH(s) for V2X sidelink communication. For the UE performing NR sidelink communication, there can be more than one configured sidelink grant activated at a time on the carrier configured for sidelink transmission. When beam failure or physical layer problem occurs on MCG, the UE can continue using the configured sidelink grant Type 1 until initiation of the RRC connection re-establishment procedure as specified in TS 38.331 [12]. During handover, the UE can be provided with configured sidelink grants via handover command, regardless of the type. If provided, the UE activates the configured sidelink grant Type 1 upon reception of the handover command or execution of CHO.

The UE can send sidelink buffer status report to support scheduler operation in NG-RAN. For NR sidelink communication, the sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

16.9.3.3 UE Autonomous Resource Selection

The UE autonomously selects sidelink resource(s) from resource pool(s) provided by broadcast system information or dedicated signalling while inside NG-RAN coverage or by pre-configuration while outside NG-RAN coverage.

For NR sidelink communication, the resource pool(s) can be provided for a given validity area where the UE does not need to acquire a new pool of resources while moving within the validity area, at least when this pool is provided by SIB. The NR SIB area scope mechanism as specified in TS 38.331 [12] is reused to enable validity area for SL resource pool configured via broadcasted system information.

The UE is allowed to temporarily use UE autonomous resource selection with random selection for sidelink transmission based on configuration of the exceptional transmission resource pool as specified in TS 38.331 [12].

3GPP TR 23.752 proposes to support UE-to-Network Relay for the following release (i.e. Release 17) as follows:

5.3 Key Issue #3: Support of UE-to-Network Relay
5.3.1 General Description

According to TS 22.261 [3] and TS 22.278 [2], support for UE-to-Network Relay needs to be studied. In addition, the Rel-16 5G architectural design (e.g. flow-based QoS communication over PC5/Uu interface) shall be taken into consideration as well.

The case that UE may be able to access to network via the direct network communication or the indirect network communication illustrated in FIG. 5.3.1-1 needs to be considered, where path #1 is direct network communication path that may not exist, as well as path #2 and path #3 are indirect network communication paths via different UE-to-Network Relays.

Figure 10:
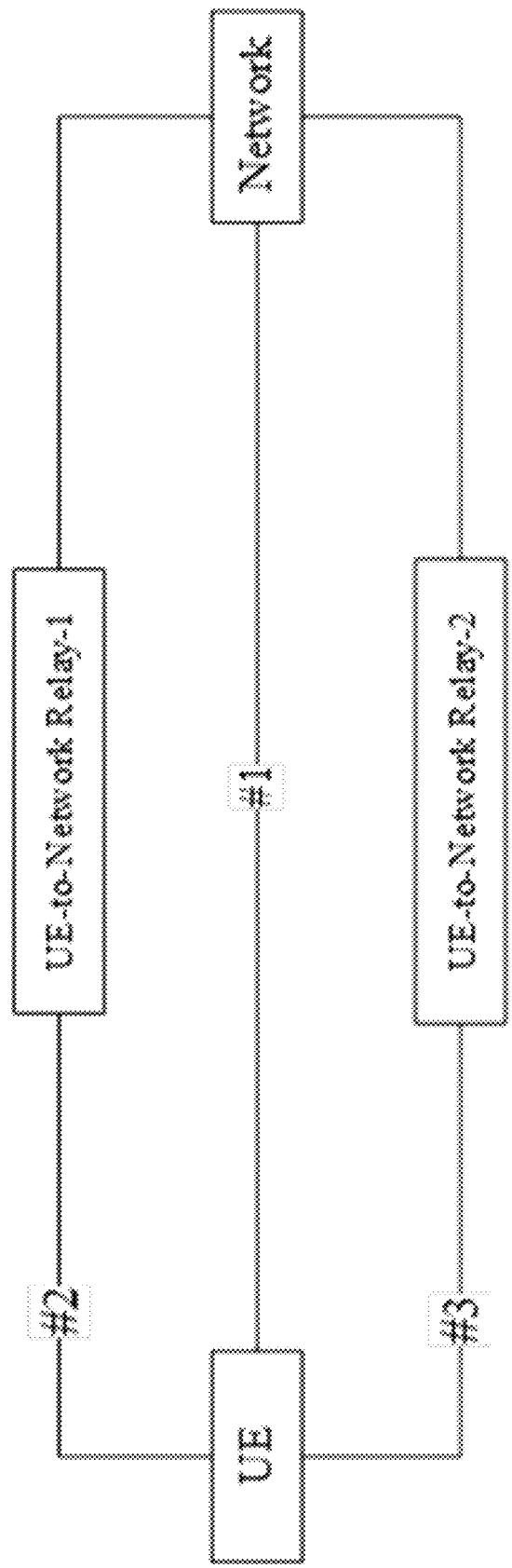
FIG. 10 is a reproduction of FIG. 5.3.1-1 of 3GPP TR 23.752 V17.0.0.

[FIG. 5.3.1-1 of 3GPP TR 23.752 V17.0.0, entitled "Example scenario of direct or indirect network communication path between UE and Network", is reproduced as FIG. 10]

Therefore, 5G ProSe needs to support UE-to-Network Relay. In particular, the following aspects need to be studied:
  How to authorize a UE to be a 5G UE-to-Network Relay and how to authorize a UE to access 5GC via a 5G UE-to-Network Relay.
  How to establish a connection between Remote UE and a UE-to-Network Relay to support connectivity to the network for the Remote UE.
  How to support end-to-end requirements between Remote UE and the network via a UE-to-Network Relay, including QoS (such as data rate, reliability, latency) and the handling of PDU Session related attributes (e.g. S-NSSAI, DNN, PDU Session Type and SSC mode).
  How the network allows and controls the QoS requirement for 5G ProSe UE-to-NW relay.
  How to transfer data between the Remote UE and the network over the UE-to-Network Relay.
  NOTE 1: Security and privacy aspects will be handled by SA WG3.
  How to (re)select a UE-to-Network Relay for communication path selection between two indirect network communication paths (i.e. path #2 and path #3 in FIG. 5.3.1-1).
  How to perform communication path selection between a direct network communication path (i.e. path #1 in FIG. 5.3.1-1) and an indirect network communication path (i.e. path #2 or path #3 in FIG. 5.3.1-1).
  How to guarantee service continuity during these communication path switch procedures for switching between a direct network communication path and an indirect communication path, as well as for switching between two indirect network communication paths.
  NOTE 2: Support of non-unicast mode communication (i.e. one-to-many communication/broadcast or multicast) between network and UE-to-Network Relay UE and between UE-to-Network Relay and Remote UE(s) depends on the result of FS_5MBS work.

Figure 11:
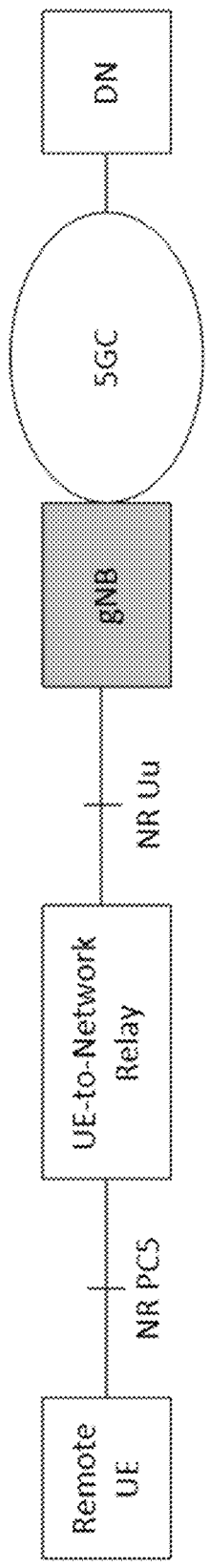
FIG. 11 is a reproduction of FIG. 5.3.1-2 of 3GPP TR 23.752 V17.0.0.
Figure 12:
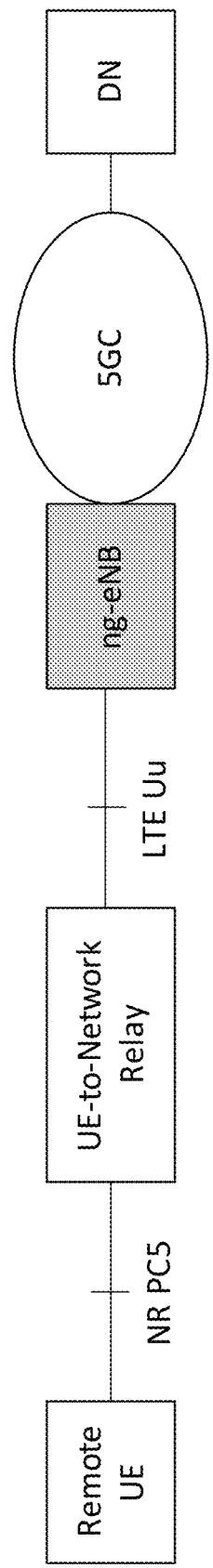
FIG. 12 is a reproduction of FIG. 5.3.1-3 of 3GPP TR 23.752 V17.0.0.

Two cases can be considered regarding support of UE-to-Network Relay, i.e. UE-to-Network Relay served by gNB as shown in FIG. 5.3.1-2 and UE-to-Network Relay served by ng-eNB as shown in FIG. 5.3.1-3.
  [FIG. 5.3.1-2 of 3GPP TR 23.752 V17.0.0, entitled "UE-to-Network Relay served by gNB", is reproduced as FIG. 11]
  [FIG. 5.3.1-3 of 3GPP TR 23.752 V17.0.0, entitled "UE-to-Network Relay served by ng-eNB", is reproduced as FIG. 12]
  NOTE 3: Whether to support the case that a UE-to-Network Relay is served by ng-eNB depends on solution to be identified in this study and RAN decision.
  NOTE 4: When UE-to-Network Relay moves to E-UTRAN, LTE PC5 based ProSe UE-to-Network Relay can be supported as defined TS 23.303 [9] for Public Safety.

[ . . . ]

3GPP TR 38.836 captures the current agreements on UE-to-Network Relay as follows:

4 Sidelink-Based UE-to-Network Relay
4.1 Scenarios, Assumptions and Requirements The UE-to-Network Relay enables coverage extension and power saving for the Remote UE. The coverage scenarios considered in this study are the following:
  UE-to-Network Relay UE is in coverage and Remote UE is out of coverage
  UE-to-Network Relay UE and Remote UE are both in coverage For L3 UE-to-Network Relay, Relay UE and Remote UE can be in the same cell or different cells, after Remote UE establishes connection via Relay UE For L2 UE-to-Network Relay, it is supported as baseline that after Remote UE connects via Relay UE, Relay UE and Remote UE are controlled by the Relay UE's serving cell For L2 UE-to-Network Relay, both cases below are supported, i.e.

Before remote connection via Relay UE, Relay UE and Remote UE are in the same cell;

Before remote connection via Relay UE, Relay UE and Remote UE are in different cells;

The considered scenarios are reflected in FIGS. 4.1-1.

Figure 13:
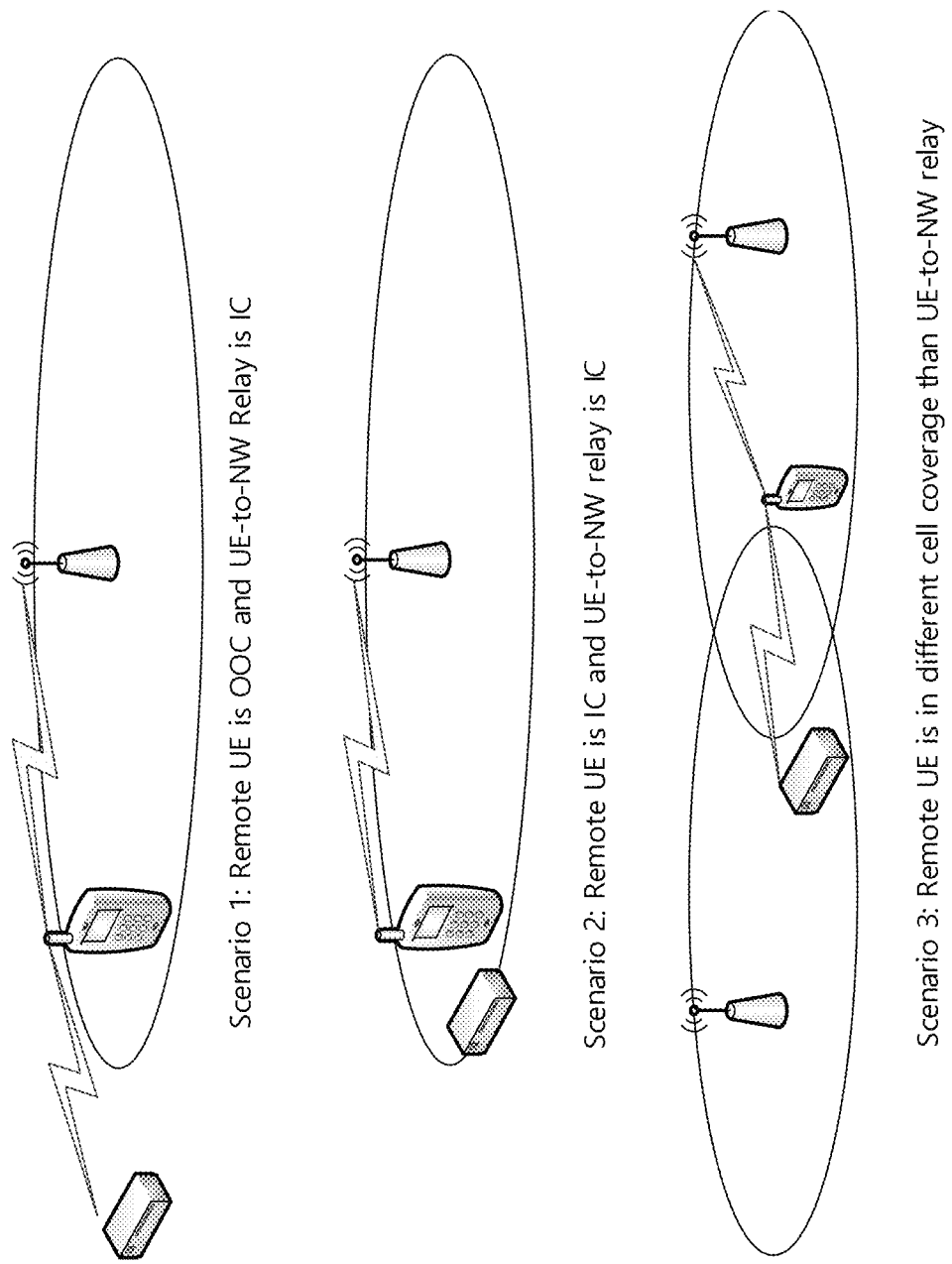
FIG. 13 is a reproduction of FIGS. 4.1-1 of 3GPP TR 38.836 V17.0.0.

[FIGS. 4.1-1 of 3GPP TR 38.836 V17.0.0, entitled "Scenarios for UE-to-Network Relay", is reproduced as FIG. 13]

NR Uu is assumed on the Uu link of the UE-to-Network Relay UE. NR sidelink is assumed on PC5 between the Remote UE(s) and the UE-to-Network Relay UE.

Cross-RAT configuration/control of UE (Remote UE or UE-to-Network Relay UE) is not considered, i.e., eNB/ng-eNB do not control/configure an NR Remote UE and UE-to-Network Relay UE. For UE-to-Network Relay, the study focuses on unicast data traffic between the Remote UE and the Network.

Configuring/scheduling of a UE (Remote UE or UE-to-Network Relay UE) by the SN to perform NR sidelink communication is out of scope of this study.

For UE-to-Network Relay, relaying of unicast data between the Remote UE and the network can occur after a PC5-RRC connection is established between the Relay UE and the Remote UE. The Uu RRC state of the Relay UE and Remote UE can change when connected via PC5. Both Relay UE and Remote UE can perform relay discovery in any RRC state. A Remote UE can perform relay discovery while out of Uu coverage.

A Relay UE must be in RRC_CONNECTED to perform relaying of unicast data.

For L2 UE-to-Network Relay:

Remote UE(s) must be in RRC CONNECTED to perform transmission/reception of relayed unicast data.

The Relay UE can be in RRC_IDLE, RRC_INACTIVE or RRC_CONNECTED as long as all the PC5-connected Remote UE(s) are in RRC_IDLE.

The Relay UE can be in RRC_INACTIVE or RRC_CONNECTED as long as all the PC5-connected Remote UE(s) are in RRC_INACTIVE.

For L3 UE-to-Network Relay, both Relay UE and Remote UE can be in RRC_INACTIVE state.

The requirement of service continuity is only for UE-to-Network Relay, but not for UE-to-UE Relay in this release.

RAN2 have studied the mobility scenario of "between direct (Uu) path and indirect (via the relay) path" for UE-to-Nework relay. RAN2 focus on the mobility scenarios of intra-gNB cases in the study phase, and assume the inter-gNB cases will also be supported. For the inter-gNB cases, compared to the intra-gNB cases, potential different parts on Uu interface in details can be discussed in the WI phase.RAN2 deprioritize work specific to the mobility scenario of "between indirect (via a first Relay UE) and indirect (via a second Relay UE)" for path switching in the SI phase, which can be studied in the WI phase, if needed.

RAN2 deprioritize the group mobility scenario in the SI phase, which may be discussed in WI phase, if needed.

[ . . . ]

4.5 Layer-2 Relay 4.5.1 Architecture and Protocol Stack 4.5.1.1 Protocol Stack

The protocol stacks for the user plane and control plane of L2 UE-to-Network Relay architecture are described in FIG. 4.5.1.1-1 and FIG. 4.5.1.1-2 for the case where adaptation layer is not supported at the PC5 interface, and FIG. 4.5.1.1-3 and FIG. 4.5.1.1-4 for the case where adaptation layer is supported at the PC5 interface.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).

Figure 14:
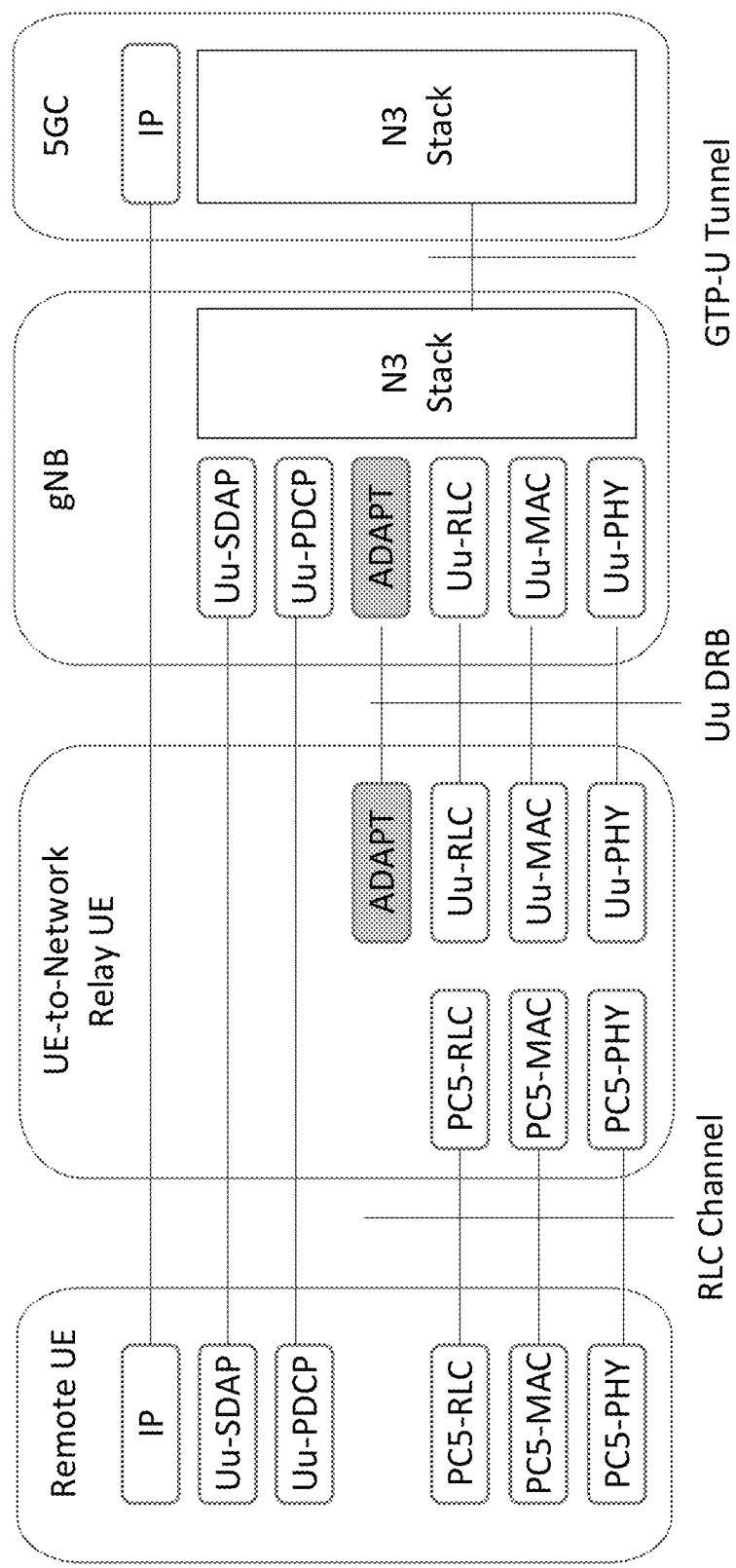
FIG. 14 is a reproduction of FIG. 4.5.1.1-1 of 3GPP TR 38.836 V17.0.0.

[FIG. 4.5.1.1-1 of 3GPP TR 38.836 V17.0.0, entitled "User plane protocol stack for L2 UE-to-Network Relay (adaptation layer is not supported at the PC5 interface)", is reproduced as FIG. 14]

Figure 15:
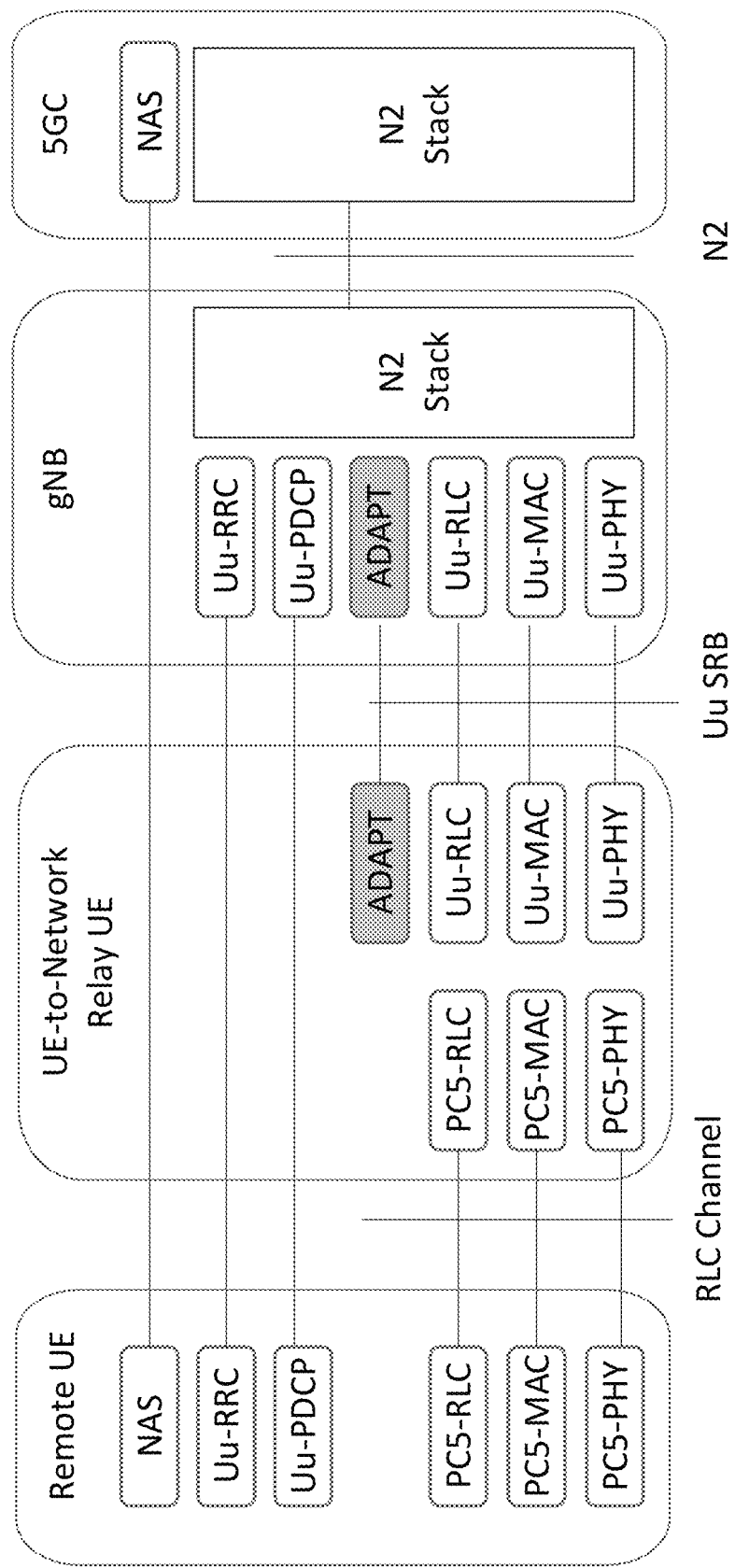
FIG. 15 is a reproduction of FIG. 4.5.1.1-2 of 3GPP TR 38.836 V17.0.0.

[FIG. 4.5.1.1-2 of 3GPP TR 38.836 V17.0.0, entitled "Control plane protocol stack for L2 UE-to-Network Relay (adaptation layer is not supported at the PC5 interface)", is reproduced as FIG. 15]

Figure 16:
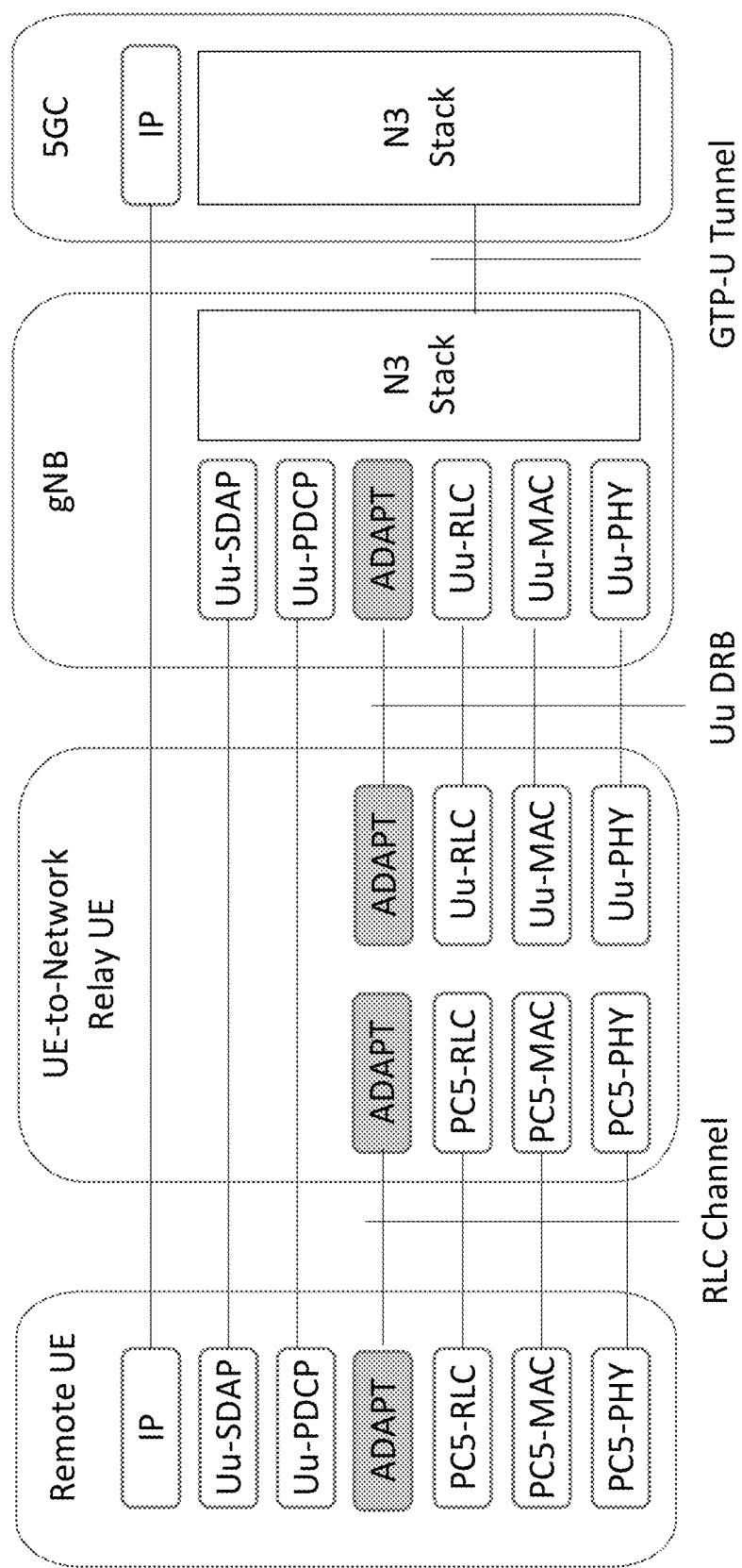
FIG. 16 is a reproduction of FIG. 4.5.1.1-3 of 3GPP TR 38.836 V17.0.0.

[FIG. 4.5.1.1-3 of 3GPP TR 38.836 V17.0.0, entitled "User plane protocol stack for L2 UE-to-Network Relay (adaptation layer is supported at the PC5 interface)", is reproduced as FIG. 16]

Figure 17:
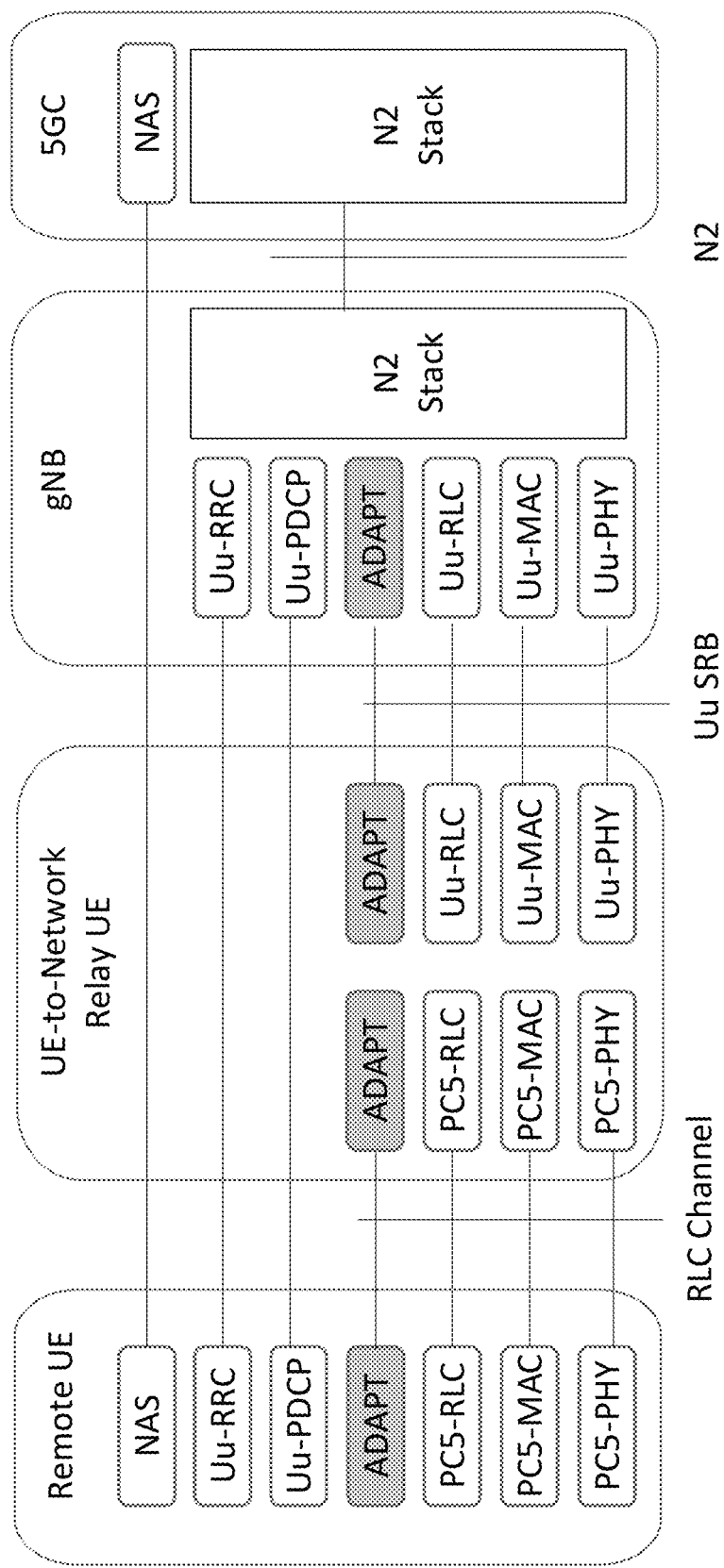
FIG. 17 is a reproduction of FIG. 4.5.1.1-4 of 3GPP TR 38.836 V17.0.0.

[FIG. 4.5.1.1-4 of 3GPP TR 38.836 V17.0.0, entitled "Control plane protocol stack for L2 UE-to-Network Relay (adaptation layer is supported at the PC5 interface)", is reproduced as FIG. 17]

4.5.1.2 Adaptation Layer Functionality

For L2 UE-to-Network Relay, for uplink:

The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.

For L2 UE-to-Network Relay, for downlink:

The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.

The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.

4.5.2 QoS gNB implementation can handle the QoS breakdown over Uu and PC5 for the end-to-end QoS enforcement of a particular session established between Remote UE and network in case of L2 UE-to-Network Relay. Details of handling in case PC5 RLC channels with different end-to-end QoS are mapped to the same Uu RLC channel can be discussed in WI phase.

[ ... ]

4.5.5 Control Plane Procedure
4.5.5.1 Connection Management

Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2 UE-to-Network relaying before Remote UE establishes a Uu RRC connection with the network via Relay UE.

For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 18:
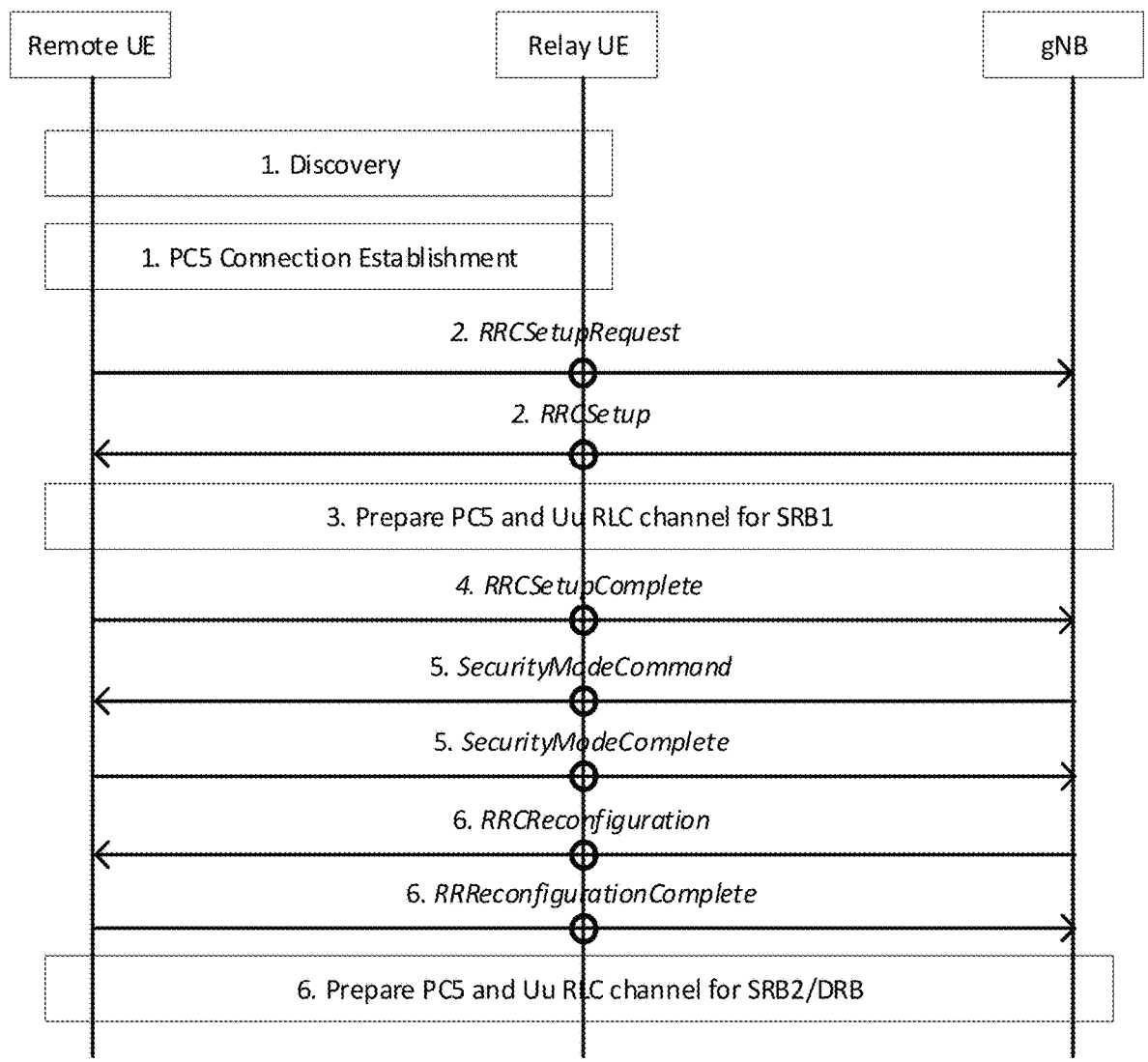
FIG. 18 is a reproduction of FIG. 4.5.5.1-1 of 3GPP TR 38.836 V17.0.0.

The following high level connection establishment procedure applies to L2 UE-to-Network Relay:

[FIG. 4.5.5.1-1 of 3GPP TR 38.836 V 17.0.0, entitled "Procedure for Remote UE connection establishment", is reproduced as FIG. 18]

Step 1. The Remote and Relay UE perform discovery procedure, and establish PC5-RRC connection using the legacy Rel-16 procedure as a baseline.

Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the Relay UE had not started in RRC_CONNECTED, it would need to do its own connection establishment upon reception of a message on the default L2 configuration on PC5. The details for Relay UE to forward the RRCSetupRequest/RRCSetup message for Remote UE at this step can be discussed in WI phase.

Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.

Step 4. Remote UE SRB1 message (e.g. an RRCSetupComplete message) is sent to the gNB via the Relay UE using SRB1 relaying channel over PC5. Then the Remote UE is RRC connected over Uu.

Step 5. The Remote UE and gNB establish security following legacy procedure and the security messages are forwarded through the Relay UE.

Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay:

The RRC reconfiguration and RRC connection release procedures can reuse the legacy RRC procedure, with the message content/configuration design left to WI phase.

The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

[ ... ]

According to 3GPP TS 38.331 NR RRC protocol specification, NR sidelink communication consists of unicast, groupcast, and broadcast. For unicast, the PC5-RRC connection (or PC5 unicast link) is a logical connection between a UE (identified by a Source Layer-2 ID) and a peer UE (identified by a Destination Layer-2 ID). PC5-RRC messages can be exchanged between these two UEs after the PC5 unicast link is established. For each PC5-RRC connection, 4 sidelink SRBs (SL-SRBs) may be established for transmitting/receiving the PC5-S messages and PC5-RRC messages. Besides, sidelink DRBs (SL-DRBs) may be established for transmitting/receiving data packets over the PC5-RRC connection.

A UE in RRC_CONNECTED may initiate a sidelink UE information procedure to request assignment of a dedicated sidelink configuration for sidelink communication transmission e.g. by transmitting a SidelinkUEInformation message to gNB. In response to reception of the SidelinkUEInformation message, gNB may reply a RRCReconfiguration message to provide the dedicated sidelink configuration in a sl-ConfigDedicatedNR. The dedicated sidelink configuration may include radio bearer configurations for SL-DRBs and the corresponding RLC bearer configurations, as well as sidelink communication resource pool(s) to use for sidelink transmission and/or reception. The dedicated sidelink configuration may also indicate a sidelink resource allocation mode, either scheduled resource allocation (indicated by a sl-ScheduledConfig) or UE autonomous resource selection (indicated by a sl-UE-SelectedConfig).

In scheduled resource allocation mode, gNB could schedule transmission resources dynamically to the UE, while in UE autonomous resource selection mode a UE autonomously selects transmission resources from the resource pool(s) included in the dedicated sidelink configuration. For a UE in RRC-IDLE, in RRC_INACTIVE, or out of RAN coverage (OOC), there is no active RRC connection between the UE and gNB and thus only the UE autonomous resource selection mode is applicable. Transmission resources from the resource pool(s), provided by system information, are selected by UEs in RRC-IDLE or RRC_INACTIVE and transmission resources from the resource pool(s), provided by pre-configuration, are selected by UEs out of RAN coverage (OOC), as discussed in 3GPP TS 38.300.

Key issue #4 in 3GPP TR 23.752 describes support of UE-to-Network Relay in the following release (i.e. Release 17), which means a relay UE will be used to support communication between a remote UE and the network in case the remote UE cannot access the network directly. There are two different types of solutions for UE-to-Network Relay proposed in 3GPP TR 23.752, including a Layer-2 (L2) based UE-to-Network Relay and a Layer-3 (L3) based UE-to-Network Relay.

The protocol stacks for the user plane and control plane of L2 UE-to-Network Relay architecture are described in FIG. 4.5.1.1-1 (which is reproduced as FIG. 14) and FIG. 4.5.1.1-2 (which is reproduced as FIG. 15) of 3GPP TR 38.836 for the case where adaptation layer is not supported at the PC5 interface. FIG. 14 and FIG. 15 indicate the relay UE communicates with the remote UE over a PC5 interface and the relay UE communicates with the gNB over a Uu interface. The adaptation layer is placed over (Radio Link Control) RLC sublayer at the Uu interface between the relay UE and the gNB. The Uu Service Data Adaptation Protocol (SDAP)/Packet Data Convergence Protocol (PDCP) and RRC are terminated between Remote UE and gNB, while RLC, Medium Access Control (MAC) and Physical (PHY) are terminated in each link (i.e. the link between the remote UE and the relay UE and the link between the relay UE and the gNB). Accordingly, each radio bearer between the remote UE and the gNB may be established in the remote UE according to a Uu RB configuration and a SL (or PC5) RLC bearer configuration.

For L2 UE-to-Network Relay, the remote UE needs to establish its own PDU session with the network before packet data transmission. Section 4.5.5.1 of 3GPP TR.836 specifies a high level procedure for remote UE connection management via a relay UE. During this procedure, the remote UE firstly discovers a relay UE. Then, the remote UE establishes a PC5-RRC connection with the relay UE. After the PC5-RRC connection has been established, the remote UE establishes a Uu-RRC connection with the gNB via the relay UE. After the Uu-RRC connection is established, the remote UE enters RRC_CONNECTED and may initiate a PDU session establishment toward the network via the relay UE, e.g. the remote UE may transmits a PDU Session Establishment Request message to the core network via the gNB, as discussed in 3GPP 23.502. This step is not shown in FIG. 18, which is a reproduction of FIG. 4.5.5.1-1 of 3GPP TR 38.836. Accordingly, the gNB may transmit a RRCReconfiguration message to the remote UE via the relay UE to set up data radio bearers (DRBs) for data packet (or traffic) transfer between the remote UE and the gNB via the relay UE for the established PDU session. The RRCReconfiguration message may include a Uu RB configuration and a SL RLC bearer configuration associated with each DRB. If the legacy way is applied, the RRCReconfiguration message may include information to indicate which sidelink resource allocation mode to use, either scheduled resource allocation or UE autonomous resource selection.

To support scheduled resource allocation, the remote UE may need to transmit sidelink buffer status report MAC control element (SL-BSR MAC CE) to the gNB via the relay UE and the gNB needs to provide dynamic sidelink grant to the remote UE via the relay UE, as discussed in 3GPP TS 38.321. However, the SL-BSR MAC CE could be generated by the PC5-MAC layer in the remote UE, and the PC5-MAC layer could be terminated between the remote UE and the relay UE. Similarly, the dynamic sidelink grant could be transmitted to the relay UE on a PDCCH by the Uu-PHY layer of the gNB, and the Uu-PHY layer could be terminated between the gNB and the relay UE. Thus, to fulfil the scheduled resource allocation, new mechanisms need to be introduced for the relay UE to forward the SL-BSR MAC CE to the gNB and to forward the dynamic sidelink grant to the remote UE.

To avoid the complexity and extra effort, it is proposed not to support the scheduled resource allocation mode for sidelink transmission from the remote UE to the relay UE in L2 UE-to-Network Relay. In one embodiment, a field used to indicate a configuration for UE autonomous resource selection (e.g. sl-UE-SelectedConfig) may be defined in the RRCReconfiguration message, while a field used to indicate a configuration for UE to transmit sidelink communication based on network scheduling (e.g. sl-ScheduledConfig) may not be defined in the RRCReconfiguration message.

Alternatively, it is possible to also define the field used to indicate a configuration for UE to transmit sidelink communication based on network scheduling (e.g. sl-ScheduledConfig) in the RRCReconfiguration message and the presence of this field is optional. In this situation, this field should not be present (or included) in the RRCReconfiguration message when the gNB sets the content of this message. In case this field is present (or included) in the RRCReconfiguration message, the remote UE would not be able to comply with this configuration and thus shall consider the configuration is invalid or it is a configuration failure. The remote UE may then initiate a RRC connection re-establishment procedure or transmit a RRC message to report the configuration failure to the gNB. Upon initiation of the RRC connection re-establishment procedure, the remote UE may transmit a RRCReestablishmentRequest message to the gNB. In response, the gNB may reply with a RRCReestablishment message. The remote UE may transmit a SidelinkUEInformation message to report the configuration failure to the gNB.

A similar situation may occur when the gNB transmits the RRCReconfiguration message to the remote UE via the relay UE to set up signaling radio bearers (SRBs) for RRC messages (or signaling) transfer between the remote UE and the gNB via the relay UE. In this situation, the above solutions are also applicable.

It is noted that a RRC Reconfiguration message may be used by the gNB to provide the related configurations to a remote UE, and the remote UE may then reply with a RRC Reconfiguration Complete message. Other types of RRC messages may be used to replace any of the above mentioned RRC messages for the same purposes.

Figure 19:
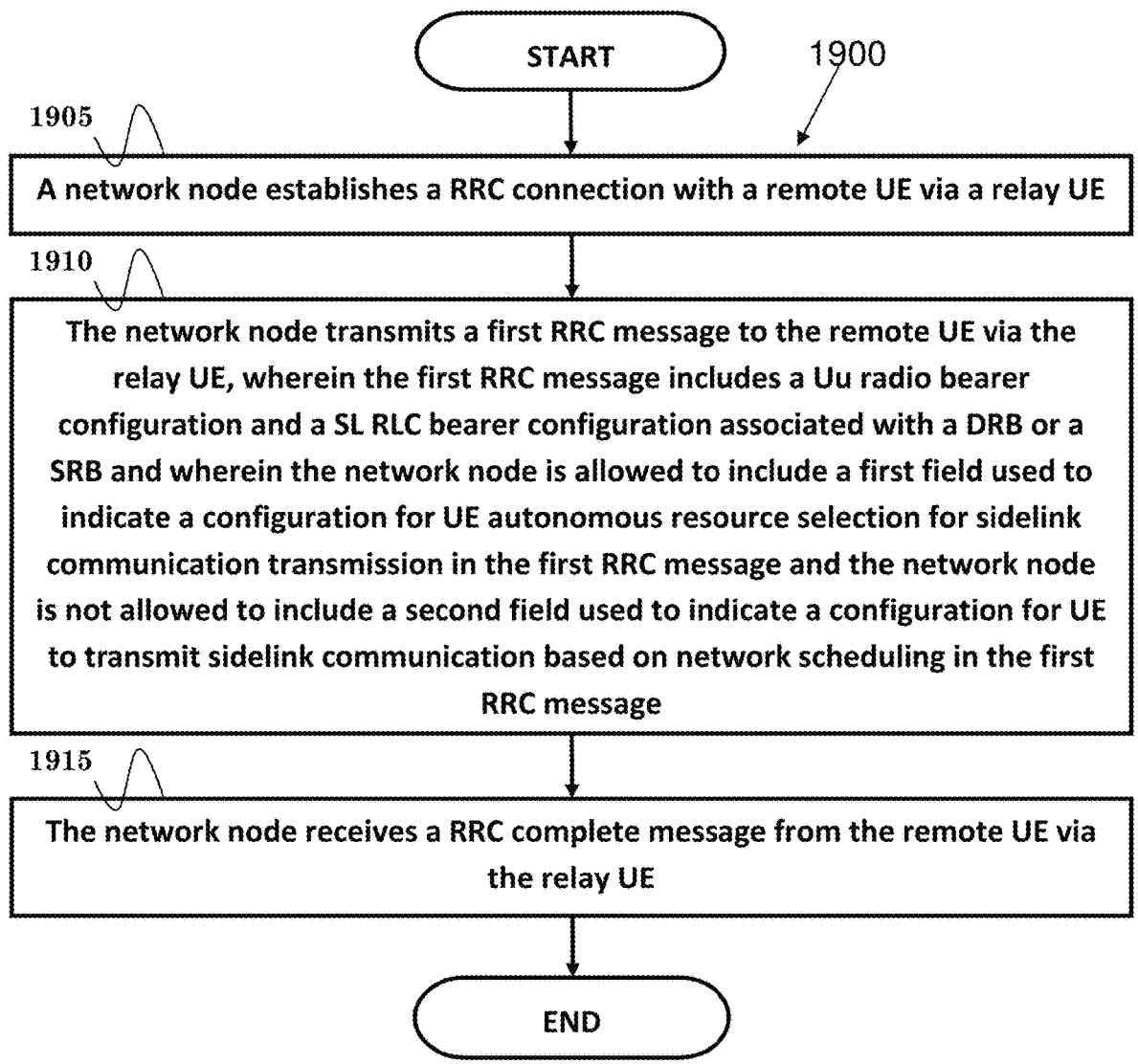
FIG. 19 is a flow chart according to one exemplary embodiment.

FIG. 19 is a flow chart 1900 illustrating a method for radio resource allocation to support UE-to-Network relaying from the perspective of a network node. In step 1905, the network node establishes a RRC connection with a remote UE via a relay UE. In step 1910, the network node transmits a first RRC message to the remote UE via the relay UE, wherein the first RRC message includes a Uu radio bearer configuration and a SL RLC bearer configuration associated with a DRB or a SRB and wherein the network node is allowed to include a first field used to indicate a configuration for UE autonomous resource selection for sidelink communication transmission in the first RRC message and the network node is not allowed to include a second field used to indicate a configuration for UE to transmit sidelink communication based on network scheduling in the first RRC message. In step 1915, the network node receives a RRC complete message from the remote UE via the relay UE.

In one embodiment, the first field may be a sl-UE-SelectedConfig. The second field may be a sl-ScheduledConfig.

In one embodiment, the first RRC message may be a RRC Reconfiguration message. The RRC complete message may be a RRC Reconfiguration Complete message. The sidelink communication could be performed on a SL RLC bearer established according to the SL RLC bearer configuration.

In one embodiment, the network node could receive a third RRC message from the remote UE for requesting assignment of a dedicated sidelink configuration for the sidelink communication. The third RRC message may be a Sidelink UE Information message.

Referring back to FIGS. 3 and 4, in one exemplary embodiment of a method for a network node, the network node 300 includes a program code 312 stored in the memory 310. The CPU 308 could execute program code 312 to enable the network node (i) to establish a RRC connection with a remote UE via a relay UE, (ii) to transmit a first RRC message to the remote UE via the relay UE, wherein the first RRC message includes a Uu radio bearer configuration and a SL RLC bearer configuration associated with a DRB or a SRB and wherein the network node is allowed to include a first field used to indicate a configuration for UE autonomous resource selection for sidelink communication transmission in the first RRC message and the network node is not allowed to include a second field used to indicate a configuration for UE to transmit sidelink communication based on network scheduling in the first RRC message, and (iii) to receive a RRC complete message from the remote UE via the relay UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for radio resource allocation to support User Equipment-to-Network (UE-to-Network) relaying, comprising:
   a network node establishes a Radio Resource Control (RRC) connection with a remote UE via a relay UE;
   the network node transmits a first RRC message to the remote UE via the relay UE, wherein the first RRC message includes a Uu radio bearer configuration and a Sidelink (SL) Radio Link Control (RLC) bearer configuration associated with a data radio bearer (DRB) or a signalling radio bearer (SRB) and wherein the network node is allowed to include a first field of sl-UE-SelectedConfig used to indicate a configuration for UE autonomous resource selection for sidelink communication transmission in the first RRC message and the network node is not allowed to include a second field of sl-ScheduledConfig used to indicate a configuration for UE to transmit sidelink communication based on network scheduling in the first RRC message; and
   the network node receives a RRC complete message from the remote UE via the relay UE.

2. The method of claim 1, wherein the first RRC message is a RRC Reconfiguration message.

3. The method of claim 1, wherein the RRC complete message is a RRC Reconfiguration Complete message.

4. The method of claim 1, wherein the sidelink communication is performed on a SL RLC bearer established according to the SL RLC bearer configuration.

5. The method of claim 1, further comprising:
   the network node receives a third RRC message from the remote UE for requesting assignment of a dedicated sidelink configuration for the sidelink communication.

6. The method of claim 5, wherein the third RRC message is a Sidelink UE Information message.

7. A network node, comprising:
   a control circuit;
   a processor installed in the control circuit; and
   a memory installed in the control circuit and operatively coupled to the processor;
   wherein the processor is configured to execute a program code stored in the memory to:
      establish a Radio Resource Control (RRC) connection with a remote UE via a relay UE;
      transmit a first RRC message to the remote UE via the relay UE, wherein the first RRC message includes a Uu radio bearer configuration and a Sidelink (SL) Radio Link Control (RLC) bearer configuration associated with a data radio bearer (DRB) or a signalling radio bearer (SRB) and wherein the network node is allowed to include a first field of sl-UE-SelectedConfig used to indicate a configuration for UE autonomous resource selection for sidelink communication transmission in the first RRC message and the network node is not allowed to include a second field of sl-ScheduledConfig used to indicate a configuration for UE to transmit sidelink communication based on network scheduling in the first RRC message; and
      receive a RRC complete message from the remote UE via the relay UE.

8. The network node of claim 7, wherein the first RRC message is a RRC Reconfiguration message.

9. The network node of claim 7, wherein the RRC complete message is a RRC Reconfiguration Complete message.

10. The network node of claim 7, wherein the sidelink communication is performed on a SL RLC bearer established according to the SL RLC bearer configuration.

11. The network node of claim 7, wherein the processor is further configured to execute a program code stored in the memory to:
    receive a third RRC message from the remote UE for requesting assignment of a dedicated sidelink configuration for the sidelink communication.

12. The network node of claim 11, wherein the third RRC message is a Sidelink UE Information message.

* * * * *